United States Patent [19]
Teicher

[11] Patent Number: 6,119,946
[45] Date of Patent: Sep. 19, 2000

[54] COUNTABLE ELECTRONIC MONETARY SYSTEM AND METHOD

[75] Inventor: Mordechai Teicher, Kfar Saba, Israel

[73] Assignee: Cardis Enterprise International N.V., Curacao, Netherlands Antilles

[21] Appl. No.: 09/050,388

[22] Filed: Mar. 3, 1998

[30] Foreign Application Priority Data

Apr. 1, 1997 [IL] Israel ......................................... 120585

[51] Int. Cl.$^7$ .................................................. G06K 19/06
[52] U.S. Cl. ........................ 235/492; 235/379; 235/380; 235/375; 235/487; 902/22; 902/26; 902/29; 902/41
[58] Field of Search .................................. 235/379, 380, 235/375, 487; 902/22, 26, 29, 41

[56] References Cited

U.S. PATENT DOCUMENTS

| | | |
|---|---|---|
| 4,454,414 | 6/1984 | Benton . |
| 4,766,293 | 8/1988 | Boston . |
| 4,877,950 | 10/1989 | Halpern . |
| 4,906,828 | 3/1990 | Halpern . |
| 4,980,542 | 12/1990 | Jackson et al. . |
| 4,992,646 | 2/1991 | Collins . |
| 5,175,416 | 12/1992 | Mansvelt et al. . |
| 5,206,488 | 4/1993 | Teicher ..................................... 235/380 |
| 5,264,689 | 11/1993 | Maes et al. . |
| 5,438,184 | 8/1995 | Roberts et al. ........................ 235/380 |
| 5,440,634 | 8/1995 | Jones et al. . |
| 5,455,407 | 10/1995 | Rosen ...................................... 235/380 |
| 5,511,121 | 4/1996 | Yacobi ..................................... 380/24 |
| 5,623,547 | 4/1997 | Jones et al. . |
| 5,650,761 | 7/1997 | Gomm et al. ........................... 235/381 |
| 5,744,787 | 4/1998 | Teicher .................................... 235/380 |
| 5,832,089 | 11/1998 | Kravitz ...................................... 380/24 |
| 5,842,185 | 11/1998 | Chancey et al. .......................... 705/40 |
| 5,872,844 | 2/1999 | Yacobi ..................................... 380/24 |
| 5,878,138 | 3/1999 | Yacobi ..................................... 380/24 |

Primary Examiner—Thien M. Le
Assistant Examiner—Daniel S Felten
Attorney, Agent, or Firm—Darby & Darby

[57] ABSTRACT

A smart card payment system using stored value in the form of serialized electronic coins and electronic bills, which provides efficient security monitoring without the need for full centralized accounting of each transaction. Central monitoring of the system-level security includes statistical sampling techniques coupled with efficient tracing of the transaction path of an electronic coin back to its source. Only small amounts of data storage and transmission are utilized, eliminating the need for large centralized databases of transaction records. Consumer privacy as well as flexibility in making card-to-card monetary transfers are thereby enhanced, while allowing verification of system-wide security as well as rapid detection and tracing of security breaches. Multiple editions of electronic coins permit transparent and periodic renewal of the system and re-establishment of a security baseline, and also provide for the regular reclamation of stored value lost or abandoned by consumers.

28 Claims, 26 Drawing Sheets

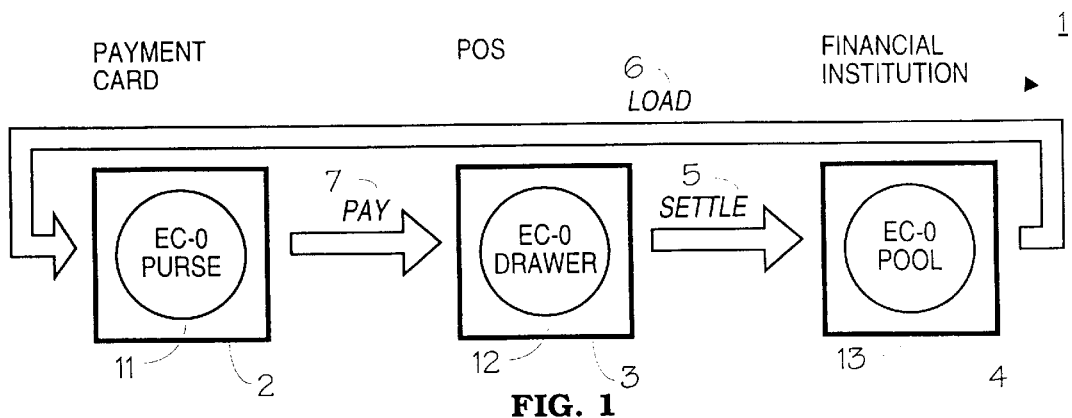
FIG. 1
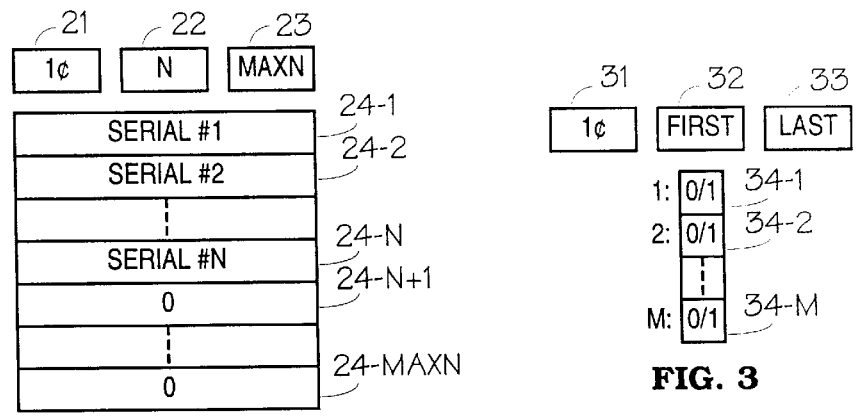
FIG. 2
FIG. 3
| CARDS IN CIRCULATION | 150,000,000 | 41-1 |
|---|---:|---|
| MAX ECS ON PURSE | 20,000 | 41-2 |
| TOTAL NUMBER OF ECS | 3,000,000,000,000 | 41-3 |
| BITS FOR SERIAL # | 42 | 41-4 |
| PARITY BITS PER SERIAL # | 3 | 41-5 |
| TOTAL BITS INCL. PARITY | 45 | 41-6 |
| BITS PER PURSE | 900,000 | 41-7 |
| BYTES PER PURSE | 112,500 | 41-8 |
| TOTAL ECS IN POS | 100,000 | 41-9 |
| BITS PER POS | 4,500,000 | 41-10 |
| BYTES PER POS | 562,500 | 41-11 |
| BYTES PER EC POOL | 375,000,000,000 | 41-12 |
FIG. 4

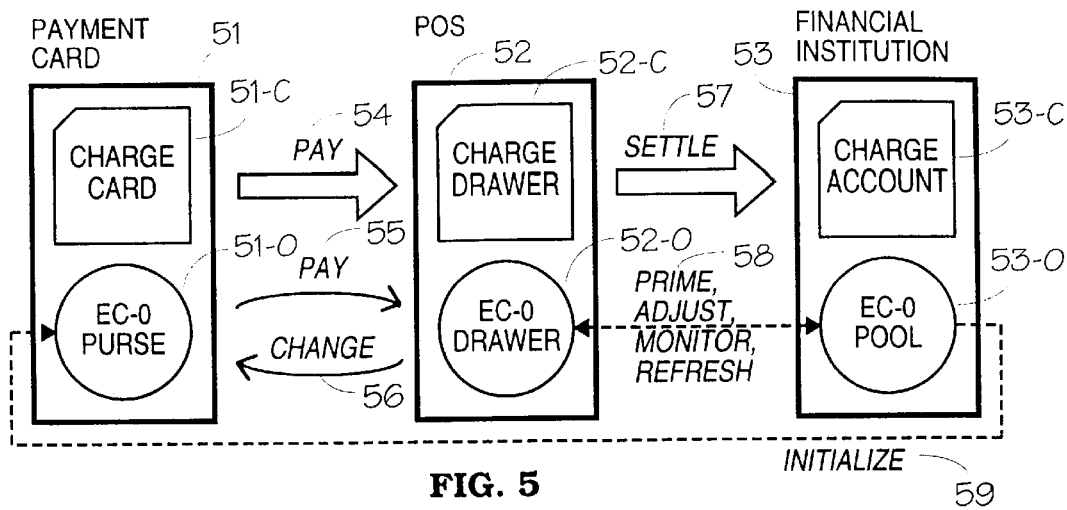
FIG. 5
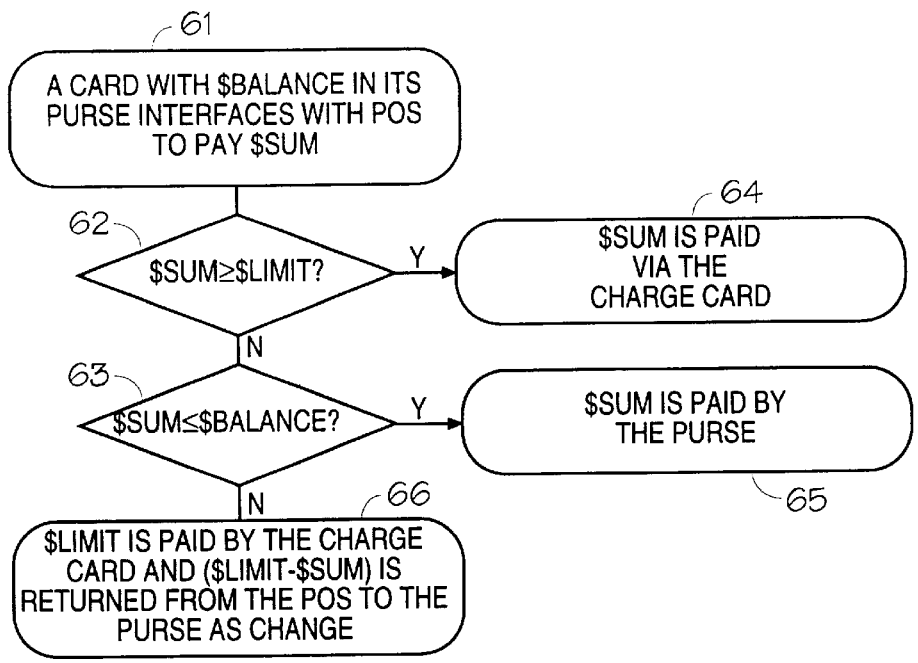
FIG. 6
| CARDS IN CIRCULATION | 150,000,000 | 71-1 |
| --- | --- | --- |
| MAX ECS ON PURSE | 2,500 | 71-2 |
| TOTAL NUMBER OF ECS | 375,000,000,000 | 71-3 |
| BITS FOR SERIAL # | 39 | 71-4 |
| PARITY BITS PER SERIAL # | 3 | 71-5 |
| TOTAL BITS INCL. PARITY | 42 | 71-6 |
| BITS PER PURSE | 105,000 | 71-7 |
| BYTES PER PURSE | 13,125 | 71-8 |
| TOTAL ECS IN POS | 100,000 | 71-9 |
| BITS PER POS | 4,200,000 | 71-10 |
| BYTES PER POS | 525,000 | 71-11 |
| BYTES PER EC POOL | 46,875,000,000 | 71-12 |
FIG. 7

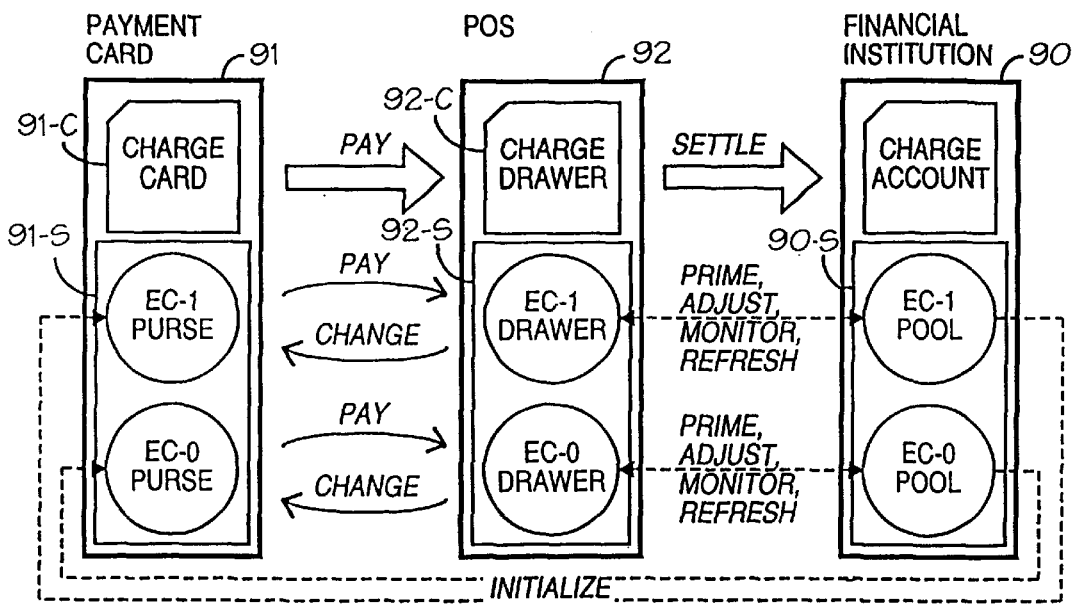
FIG. 9
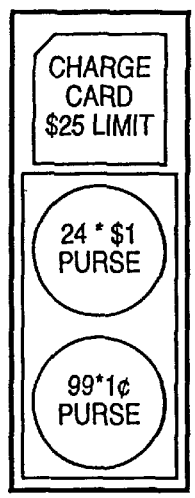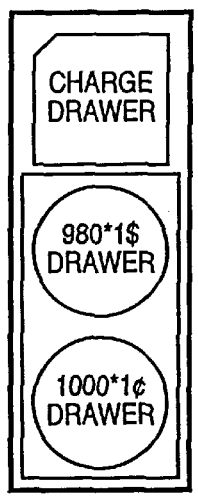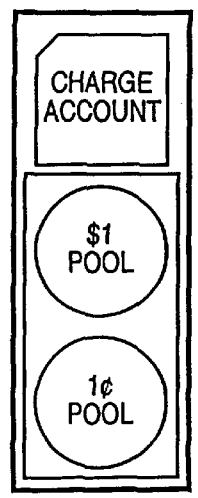
FIG. 9A
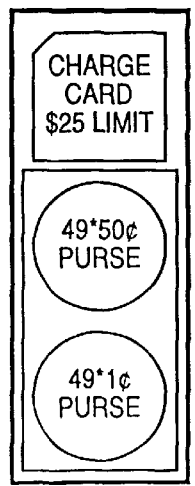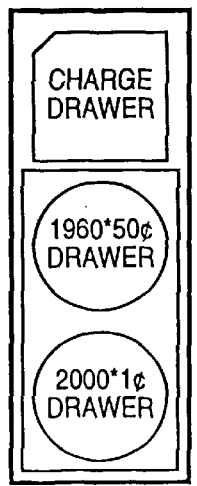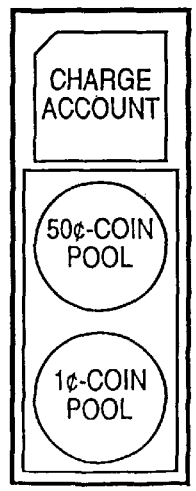
FIG. 9B

| E-COIN VALUE: | $1 | 1¢ | |
|---|---|---|---|
| PAYMENT CARD | | | 100-1 |
| CARDS IN CIRCULATION | 150,000,000 | | 100-2 |
| MAX ECS ON PURSE | 24 | 99 | 100-3 |
| TOTAL NUMBER OF ECS | 3,600,000,000 | 14,850,000,000 | 100-4 |
| BITS FOR SERIAL # | 32 | 34 | 100-5 |
| PARITY BITS PER SERIAL # | 3 | 3 | 100-6 |
| TOTAL BITS INCL. PARITY | 35 | 37 | 100-7 |
| BITS PER PURSE | 840 | 3,663 | 100-8 |
| BYTES PER EC TYPE | 105 | 458 | 100-9 |
| TOTAL BYTES PER PURSE | 563 | | 100-10 |
| POS | | | |
| TOTAL E-COINS IN POS | 990 | 1,000 | 100-11 |
| BITS PER EC TYPE | 34,650 | 37,000 | 100-12 |
| BYTES PER EC TYPE | 4,331 | 4,625 | 100-13 |
| TOTAL BYTES PER POS | 8,956 | | 100-14 |
| FINANCIAL INSTITUTION | | | |
| BYTES PER EC TYPE | 450,000,000 | 1,856,250,000 | 100-15 |
| TOTAL BYTES PER POOL | 2,306,250,000 | | 100-16 |

FIG. 10A

| E-COIN VALUE: | 50¢ | 1¢ | |
|---|---|---|---|
| PAYMENT CARD | | | 101-1 |
| CARDS IN CIRCULATION | 150,000,000 | | 101-2 |
| MAX ECS ON PURSE | 49 | 49 | 101-3 |
| TOTAL NUMBER OF ECS | 7,350,000,000 | 7,350,000,000 | 101-4 |
| BITS FOR SERIAL # | 33 | 33 | 101-5 |
| PARITY BITS PER SERIAL # | 3 | 3 | 101-6 |
| TOTAL BITS INCL. PARITY | 36 | 36 | 101-7 |
| BITS PER PURSE | 1,764 | 1,764 | 101-8 |
| BYTES PER EC TYPE | 221 | 221 | 101-9 |
| TOTAL BYTES PER PURSE | 442 | | 101-10 |
| POS | | | |
| TOTAL E-COINS IN POS | 1,960 | 2,000 | 101-11 |
| BITS PER EC TYPE | 70,560 | 72,000 | 101-12 |
| BYTES PER EC TYPE | 8,820 | 9,000 | 101-13 |
| TOTAL BYTES PER POS | 17,820 | | 101-14 |
| FINANCIAL INSTITUTION | | | |
| BYTES PER EC TYPE | 918,750,000 | 918,750,000 | 101-15 |
| TOTAL BYTES PER POOL | 1,837,500,000 | | 101-16 |

FIG. 10B

| E-COIN VALUE: | $10 | $1 | 1¢ | |
|---|---|---|---|---|
| PAYMENT CARD | | | | 121-1 |
| CARDS IN CIRCULATION | | 150,000,000 | | 121-2 |
| MAX ECS ON PURSE | 19 | 9 | 99 | 121-3 |
| TOTAL NUMBER OF ECS | 2,850,000,000 | 1,350,000,000 | 14,850,000,000 | 121-4 |
| BITS FOR SERIAL # | 32 | 31 | 34 | 121-5 |
| PARITY BITS PER SERIAL # | 3 | 3 | 3 | 121-6 |
| TOTAL BITS INCL. PARITY | 35 | 34 | 37 | 121-7 |
| BITS PER PURSE | 665 | 306 | 3,663 | 121-8 |
| BYTES PER EC TYPE | 84 | 39 | 458 | 121-9 |
| TOTAL BYTES PER PURSE | | 581 | | 121-10 |
| POS | | | | |
| TOTAL ECS IN POS | 100 | 100 | 500 | 121-11 |
| BITS PER EC TYPE | 3,500 | 3,400 | 18,500 | 121-12 |
| BYTES PER EC TYPE | 438 | 425 | 2,313 | 121-13 |
| TOTAL BYTES PER POS | | 3,175 | | 121-14 |
| FINANCIAL INSTITUTION | | | | |
| BYTES PER EC TYPE | 356,250,000 | 168,750,000 | 1,856,250,000 | 121-15 |
| TOTAL BYTES PER POOL | | 2,381,250,000 | | 121-16 |

| | |
|---|---|
| CARDS IN CIRCULATION | 150,000,000 |
| MAX ECS PER TYPE | 1 |
| TOTAL NUMBER OF ECS | 150,000,000 |
| BITS FOR SERIAL # | 28 |
| PARITY BITS PER SERIAL # | 3 |
| TOTAL BITS INCL. PARITY | 31 |
| BITS PER TYPE | 31 |
| BYTES PER PURSE=16 TYPES | 62 |
| TOTAL ECS IN POS/TYPE | 100 |
| BITS PER TYPE | 3,100 |
| BYTES PER POS=16 TYPES | 6,200 |
| BYTES PER 16-TYPE POOL | 300,000,000 |

| EC VALUE GROUP: | 1¢,10¢,$1,$5 | 5¢,50¢ | $25 | |
|---|---|---|---|---|
| PAYMENT CARD | | | | 180-1 |
| CARDS IN CIRCULATION | | 150,000,000 | | 180-3 |
| MAX ECS ON PURSE | 4 | 1 | 10 | 180-4 |
| TOTAL NUMBER OF ECS | 600,000,000 | 150,000,000 | 1,500,000,000 | 180-5 |
| BITS FOR SERIAL # | 30 | 28 | 31 | 180-6 |
| PARITY BITS PER SERIAL # | 3 | 3 | 3 | 180-7 |
| TOTAL BITS INCL. PARITY | 33 | 31 | 34 | 180-8 |
| BITS PER PURSE PER TYPE | 132 | 31 | 340 | 180-9 |
| NUMBER OF TYPES/GROUP | 4 | 2 | 1 | 180-10 |
| NUMBER OF BITS/GROUP | 528 | 62 | 340 | 180-11 |
| TOTAL NUMBER OF BITS/ CARD | | 930 | | 180-12 |
| TOTAL BYTES PER CARD | | 117 | | 180-13 |
| POS | | | | |
| TOTAL ECS IN POS | 400 | 200 | 200 | 180-14 |
| BITS PER EC TYPE | 13,200 | 6,200 | 6,800 | 180-15 |
| BYTES PER EC TYPE | | 26,200 | | 180-16 |
| TOTAL BYTES PER POS | | 3,275 | | 180-17 |
| FINANCIAL INSTITUTION | | | | |
| BYTES PER GROUP | 300,000,000 | 37,500,000 | 187,500,000 | 180-18 |
| TOTAL BYTES PER POOL | | 525,000,000 | | 180-19 |

FIG. 18

| | |
|---|---|
| CARDS IN CIRCULATION | 150,000,000 |
| MAX E-BILLS PER CARD | 40 |
| TOTAL NUMBER OF ECS | 6,000,000,000 |
| BITS FOR SERIAL # | 33 |
| PARITY BITS PER SERIAL # | 3 |
| TOTAL BITS INCL. PARITY | 36 |
| BITS PER CARD | 1,440 |
| BYTES PER CARD | 180 |
| TOTAL E-BILLS IN POS | 80 |
| BITS IN POS | 2,880 |
| BYTES PER POS=16 TYPES | 360 |
| BYTES PER POOL | 750,000,000 |

241-1, 241-2, 241-3, 241-4, 241-5, 241-6, 241-7, 241-8, 241-9, 241-10, 241-11, 241-12

COUNTABLE ELECTRONIC MONETARY SYSTEM AND METHOD

FIELD AND BACKGROUND OF THE INVENTION

The present invention relates to a smart card payment system, and in particular to such a system with system-level monitoring of the stored value.

Smart card technology has enabled two consumer payment applications: the charge (credit or debit) card with enhanced security (especially in off-line payment,) and the stored-value card, also called electronic purse. The two applications are complementary: the charge card is more suitable for medium-to-higher payments, while the electronic purse's arena is small payments. The potential synergy between these two payment applications is described in a co-pending U.S. patent application Ser. No. 08/533,599 of Sep. 25, 1995, and in its equivalent PCT publication WO 96/09592, both by the present inventor.

A major concern in any payment system is security, i.e., preventing unauthorized transfer or production of money. In smart card stored-value payment, a vast number of patents, publications and implemented solutions deal with safeguarding payment and other value transfer transactions at the bank-to-consumer, consumer-to-merchant and merchant-to-bank levels. There are combinations of hardware, software and procedures believed to withstand any attack conducted for a reasonable time using known means. However, as security is so crucial to payment systems, many bankers insist on monitoring the flow of money at the system level, to reconfirm the flawless operation of the security means at the transaction levels. This security requirement has been commonly transformed into the concept of "full accountability", i.e. recording and reporting all single stored-value transactions to a central computer, for checking and confirming that each addition of value to a first stored-value device has occurred only as the same amount had been deducted from a second stored-value device. Such accountability schemes require an enormous amount of data storage and transfer and may interfere with the privacy of consumers carrying personal payment cards.

OBJECTS AND BRIEF SUMMARY OF THE INVENTION

The main object of the present invention is to monitor centrally the stored value (hereinafter referred-to as "electronic cash") in a stored-value system, for system-level reconfirmation of transaction-level security, without recording and reporting each single transaction. Another object is to minimize the amount of data stored and transferred for such monitoring. Still another object is to enable consumer anonymity and privacy in most small payments. Additional objects include measuring the amount of stored value lost or abandoned by consumers; measuring the amount of invalid stored value (if transaction-level security has malfunctioned or has been broken); providing controlled refresh options for periodical renewal of electronic cash and its security parameters; maintaining local audit trails for identifying the sources of fraudulent electronic cash; supporting multiple-issuer environments; and enabling satisfactorily-monitored card-to-card transfer of electronic cash.

The following terms will be used herein as follows:

1. Electronic money—value which is recorded electronically and is useful for payment.
2. Account—a storage of electronic money or debt at an institution. Non-limiting examples are bank accounts and credit accounts. The accounts of interest to the present invention are consumer account and merchant account.
3. Financial institution—a business entity establishing and maintaining accounts. Examples of financial institutions are banks, credit companies and telephone companies. Actually, the term financial institution will usually relate to the computer system of such institutions used to store and maintain accounts and execute transactions therewith.
4. Charge—a consumer order to transfer electronic money from his account to another account.
5. Electronic cash—electronic money in a form which can be transferred to and stored in a consumer or merchant electronic storage device.
6. Stored-value device—an electronic storage device for storing electronic cash.
7. Payment card—a consumer device for payment with electronic money. A payment card may include a charge card for generating charge orders (e.g., credit card or debit card), and/or an electronic purse, which is a consumer stored-value device.
8. Smart card—a payment card designed to secure the information stored therein and the transactions made therewith.
9. Point of sale or POS—a merchant's device for receiving payment and optionally also for determining the purchase contents and calculating the payment amount. A POS may be staffed (e.g., a supermarket cash register) or automatic (e.g., in a vending machine, public telephone or parking meter).
10. Electronic drawer or drawer—a merchant's secured electronic storage device, usually forming part of a POS, for storing electronic cash (electronic cash drawer) and/or charge orders (charge drawer).
11. Electronic cash pool—a stored-value device of a financial institution, for storing and accounting for electronic cash.
12. Elementary monetary value or EMU—the smallest amount of monetary value that is relevant for payment or change. An example is 1¢ in the POS, or 5 Agorot in Israel.
13. Serial number—data used for identification of a discrete entity, and suitable for digital representation. Typical examples for serial numbers are positive integers and ASCII character strings.

The present invention makes electronic cash countable by devising the entity "electronic coin", each electronic coin having a monetary value and a serial number. When an electronic coin moves, it moves along with its value and serial number. A percentage of random electronic coins flow through electronic coin pools of financial institutions, where forbidden repetitions or out-of-range serial numbers are sought. Such repetitions or out-of-range instances, if found, are reported to signal that there is a security leak at the transaction level and to estimate the size of the damage.

By creating a hierarchy of electronic coin types, each having a denomination which is a multiple of the previous denomination, the present invention supports very effective payment while minimizing storage requirements for electronic coins, especially on the payment card. The present invention teaches how to allocate tens or a couple hundred bytes of memory on the card, for storing hundreds of dollars, with 1¢ resolution, in a hundreds million card population, with a unique serial number for each electronic coin. This minimal storage requirement also implies minimal data communication requirement during transactions, which minimizes transaction time and enhances reliability.

The present invention also investigates the money flow in the monetary system constructed and operated according to the present invention, showing that most electronic cash actually revolves between points of sale and payment cards, while the actual monetary transfers are made mainly by charge (credit or debit) transactions and/or by electronic bills, which are higher-denomination electronic coins which are allowed for manual reloading of payment cards.

Another aspect relates to managing local audit trails, where each stored-value device records the serial numbers of received electronic coins along with the identity of the source device. These records are kept for a limited time, and are useful to trace back suspected electronic coins to identify, the source devices for further investigation.

By changing editions periodically, the present invention teaches to refresh security parameters, recall efficiently and automatically the older edition's electronic coins, count them with accuracy of a single cent, identify security flaws precisely, and account for electronic cash lost or abandoned by card holders, i.e. electronic cash not claimed by the expiration date of the old edition.

Other important achievements of the present invention include a very effective support for system-level-audited card-to-card electronic cash transfers, and the provision of ultimate anonymity at most transactions. The invention offers flexibility in supporting different card types to populations of different needs and preferences, including the co-existence of personal cards having both charge and stored-value functions, and "white", stored-value-only cards. Methods for accelerating the edition refreshing and enhancing the security sampling rate and reliability are also presented, including forced exchange of electronic coins and random or FIFO (first-in-first-out) electronic coin picking.

The present invention also teaches how to manage a multi-issuer environment, where every issuer is assigned a distinctive range of serial numbers. A semi-countable system is also presented, where higher denomination electronic coins are counted according to the present invention, while lower denominations are inspected statistically. There is considerable prior art in the field of transferring monetary value electronically, but the present invention differs significantly from prior art systems with regard to objectives, organization, utilization, and operating environment.

For example, the "Value Transfer System" of U.S. Pat. No. 5,440,634 and U.S. Pat. No. 5,623,547 to Jones et al. disclose a coinless purse system that requires a separate loading operation and independent account reconciliation on individually-stored transactions. This is in contrast to the system of the present invention, which utilizes electronic coins and does not necessarily require a separate loading operation or account reconciliation.

It should also be noted in particular that the general concept of convenient payment instruments in the form of indivisible digital tokens, sometimes referred to as "ecoins", is likewise well known in the art. The present invention, however, differs significantly from prior art implementations of "ecoin" payment systems, with regard to its objectives, operating environment, and electronic coin transfer protocol.

For example, the prior art "ecoin" payment system of DigiCash BV (Amsterdam, The Netherlands) is intended to facilitate the making of payments over a possibly unreliable communication channel (such as a data network) and to reduce the risk of lost value due to storage and transmission errors. In the DigiCash system, "ecoins" are uniquely serialized, and any holder of an "ecoin" can make unlimited copies of the "ecoin" for legitimate purposes, such as backup against inadvertent loss. In fact, the copies of a DigiCash "ecoin" with a specific serial number are indistinguishable from one another, so that it is meaningless to speak of an "original" DigiCash "ecoin" as distinct from the copies of that "ecoin". In the DigiCash system, the transfer of an "ecoin" from payer to payee consists of sending a copy of the "ecoin" from payer to payee. A copy of the "ecoin" remains with the payer, so that the "ecoin" may be sent repeatedly to the payee in the event of communications errors or other loss.

The DigiCash system maintains integrity against unauthorized creation of value with a central database containing records of spent "ecoin" serial numbers, so that any given "ecoin" can be used to transfer value from any payer to any payee only once. A payee who receives an "ecoin" immediately sends a copy of the "ecoin" to the issuer (usually a bank), who records the "ecoin" serial number in the central database of spent "ecoins" and validates the payment, either by crediting the payee's account with the value or by returning a new (unspent) "ecoin" of equal value to the payee, which the payee may then spend. But subsequent attempts to transfer value from any payer to any payee using an "ecoin" that is registered in the central database as having already been "spent" will be rejected, and in this way the making of copies of "ecoins" does not impact the monetary value in the DigiCash system.

In contrast, the electronic coin system of the present invention is intended to facilitate the utilization of account-to-account transfers (credit or debit) for making cumulative small payments, and employs a highly reliable communication channel (a smart card), in which the probability of a communications or storage failure of the devices themselves is negligibly small. In the system according to the present invention, electronic coins are uniquely serialized, but the transfer protocol precludes the making of copies. In the system according to the present invention, therefore, there exists at most a single electronic coin corresponding to any given serial number, and the transfer of an electronic coin from payer to payee consists of sending the electronic coin to the payee in such a way that no copy of the electronic coin remains with the payer. In the system according to the present invention, electronic coins circulate like their physical counterparts, and a particular electronic coin may therefore be spent more than once, in contrast to the prior art system, which allows only a single payment per "e-coin". A typical transaction of the present invention distinctly involves electronic coins of different denominations moving between two stored-value devices in both ways to account for the desired value. The electronic coin pool of the present invention is furthermore distinct from the prior art central database in that the electronic coins in the electronic coin pool are still valid and may be put back into circulation for further spending, whereas the prior art central database is merely a listing of "e-coins" which are no longer valid for transactions.

Thus, according to the present invention, there is provided a countable electronic monetary system for the transfer of electronic money in amounts which are an integer multiple of an elementary monetary unit, the transfer of electronic money made between two selected ones from a plurality of payment cards, a plurality of points of sale and a number of financial institutions, the countable electronic monetary system including:

(a) at least one electronic coin type, each electronic coin type of the at least one electronic coin type having a denomination of an integer number of the elementary monetary unit;

(b) a plurality of electronic coins each belonging to one of the at least one electronic coin type, each electronic coin of the plurality of electronic coins having a serial number;

(c) a plurality of stored-value devices, each for storing electronic coins from the plurality of electronic coins, including:

a plurality of electronic coin purses, each included in a payment card of the plurality of payment cards;

a plurality of electronic coin drawers, each included in a point of sale of the plurality of points of sale; and a number of electronic coin pools, each included in a financial institution of the number of financial institutions;

and transaction means for the transfer of a selectable number of electronic coins belonging to a selectable electronic coin type, from a source stored-value device selected from the plurality of stored-value devices to another, second stored-value device selected from the plurality of stored-value devices, the transaction means being operative to record the serial number of each one of the transferred electronic coins in the target stored-value device and to erase this serial number from the first stored-value device.

Other aspects of the present invention are presented in the detailed specifications hereinbelow.

BRIEF DESCRIPTION OF THE DRAWINGS

For brevity in the drawings, an electronic coin is denoted by the label "EC" and an electronic bill is denoted by the label "E-Bill"

FIG. 1 is a block and flow diagram illustrating the main elements of a basic form of the payment system in accordance with a preferred embodiment of the present invention;

FIG. 2 is a block diagram illustrating the memory organization in preferred embodiments of cards and POS according to the present invention;

FIG. 3 is a block diagram illustrating the memory organization in preferred embodiments of financial institution computers according to the present invention;

FIG. 4 is a table illustrating the calculation of the memory requirements for the embodiment of FIG. 1;

FIG. 5 is a block and flow diagram illustrating the structure and operation of a further preferred embodiment of the present invention;

FIG. 6 is a flowchart illustrating the payment procedure of the embodiment of FIG. 5;

FIG. 7 is a table illustrating the calculation of the memory requirements for the embodiment of FIG. 5;

FIGS. 9, 9A and 9B are block diagrams illustrating a further preferred embodiment of the present invention;

FIGS. 10A and 10B are tables illustrating the calculation of the memory requirements of the cases described in FIG. 9A and 9B, respectively;

FIG. 18 is a table illustrating the calculation of the memory requirements for the embodiment of FIG. 17;

DESCRIPTION OF THE PREFERRED EMBODIMENTS

Figure 8:
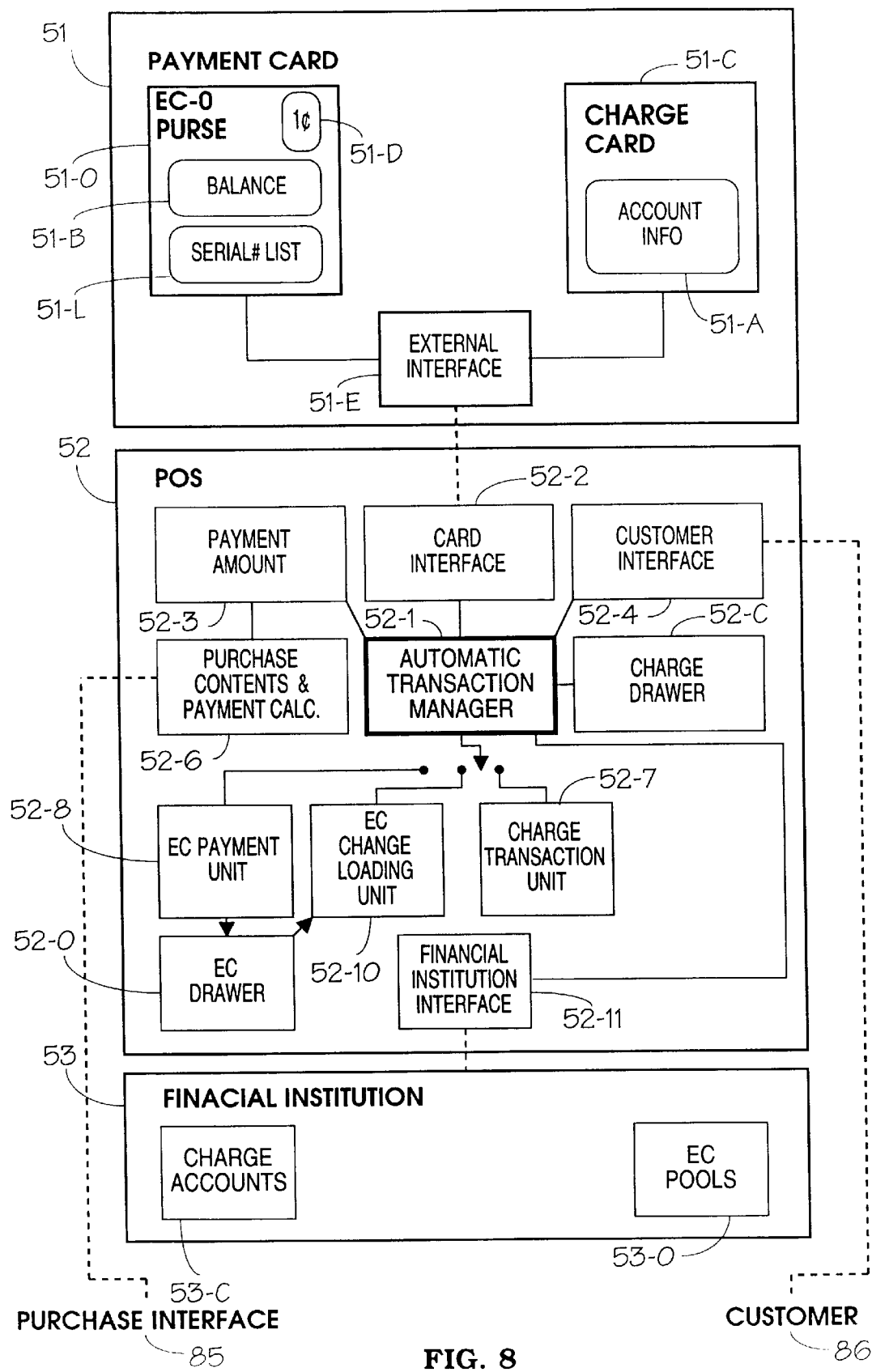
FIG. 8 is a block diagram illustrating in detail the main units of the embodiment of FIG. 5.

1. Electronic Coins and Electronic Coin Transactions

Payment is made in values that are a multiple of an elementary monetary unit (EMU). Hereinbelow the value of 1¢ is less used as an example of EMU, although in other countries the practical EMU may have values such as 5, 10 or 100 units of the lowest monetary denomination.

A basic concept to the present invention is the electronic coin. This is an information entity, which can be stored electronically in stored-value devices, and moved between such devices. An electronic coin has a denomination that is an integer multiple of an EMU, and a serial number. Preferably, a serial number will be unique to each single electronic coin of a specific denomination; however, a small, predefined number of repetitions of the same serial number may be pre-programmed into the system and allowed. Also, it is noted that the serial number may be represented for human reading in any acceptable form such as Arabic numerals, letters, etc.; however, its computerized storage will be in a standard computer storage form, e.g. binary.

According to the present invention, when transferring an electronic coin from a stored-value device (the source) to another stored-value device (the target), the serial number of this electronic coin is erased from the source and written onto the target stored-value device. Thus, whenever the verbs "move" or "transfer" are mentioned hereinbelow in conjunction with an electronic coin, it should be understood that the serial number of this electronic coin is erased from and written onto the source and target stored-value devices, respectively. However, the term "erase", relating to digital storage, is essentially logical and should be interpreted hereinafter liberally; for instance, erasure may be implemented by a logical flag indicating that the storage space of an electronic coin serial number has been freed and is available for storage of another electronic coin serial number, while the resident "erased" serial number becomes logically inaccessible without necessarily resetting the bits representing this erased serial number.

Electronic coins of different denominations may coexist in the same system. In this case, electronic coins having the same denomination will be referred to hereinbelow as belonging to same "electronic coin type."

2. Payment System Configurations 2.1. Basic Payment System Using Elementary Electronic Coins Only (FIGS. 1–4)

An embodiment of a basic payment system based on the present invention, uses a single electronic coin type, having the denomination of one EMU (elementary monetary value), e.g. 1¢. This electronic coin type is called the elementary electronic coin, or electronic coin-0.

FIG. 1 is a block diagram describing the main elements of the basic form of a payment system of the present invention, generally designated 1. A payment card 2 is one of a large plurality of payment cards used by consumers for payment. Payment card 2 is either in the well-known form of a credit-card-like plastic card with an embedded chip, or in any other form, such as key-chain, toll-payment transponder, or part of a personal computer or part of a cellular telephone. Payment card 2 includes electronic coin-0 purse 11, which is a stored-value device containing security information and elementary electronic coins in the manner described in FIG. 2. A POS 3 is one of a plurality of points of sales used by merchants to receive payment from consumers. POS 3 can be a manned or automatic, and can also include means for determining the purchase contents and calculating the amount due for payment. POS 3 includes electronic coin-0 drawer 12, which is a stored-value device containing security parameters and elementary electronic coins in the manner described in FIG. 2. The aggregate of computer systems of financial institutions, designated 4, includes an electronic coin-0 pool 13, which is a stored-value device containing security parameters and elementary electronic coins in a manner described in FIG. 3. A payment transaction 7 is executed when card 2 is inserted into POS 3 or communicates with POS 3 in any other way (e.g. over the Internet); this payment transaction moves a specified number of elementary electronic coins from electronic coin-0 purse 11 to electronic coin-0 drawer 12, each elementary electronic coin transfer including the erasure of this electronic coin's serial number from purse 11 and its recording in drawer 12. In settlement transaction 5, POS 3 communicates with financial institutions 4, to transfer elementary electronic coins from electronic coin-0 drawer 12 to electronic coin-0 pool 13 and claim their total value: the communication between POS 3 and financial institutions 4 can be made through telephone or data communication physical or cellular links, through hand-held devices or by physically transferring drawer 12 to a terminal of financial institution 4. In load transaction 6, card 2 communicates with financial institution computers 4, preferable by presenting the card at a terminal connected to computers 4 (such as in a bank counter, ATM, special telephone or dedicated home unit); the consumer then pays a selected amount with an, monetary instrument acceptable at that terminal, an equivalent amount of elementary electronic coins is then moved from pool 13 to purse 11, each elementary electronic coin transfer including the erasure of this electronic coin's serial number from pool 13 and its recording onto purse 11.

FIG. 2 is a block diagram illustrating the storage of electronic coins in electronic coin stored-value devices such as purse 11 or drawer 12 of FIG. 1. A register 21 contains the denomination the electronic coins stored in this stored-value device. A register 22 stores the current number of stored-value units: multiplying this number by denomination 21 yields the total value stored in this storage device. A register 23 shows the capacity of the electronic coin stored-value device, i.e. the maximum number of electronic coins which can be stored therein. Registers 24-1 to 24-N include the serial numbers of the currently-stored electronic coins, preferable with a few parity bits added to each register for ensuring data integrity and security; the rest of the registers (24-N+1 to 24-MAXN) include the number zero, which means that no electronic coins are currently stored therein.

FIG. 3 shows an alternative way to store electronic coins, which is aimed at storing a vast number of units, typically at electronic coin pool 13. A register 31 includes the denomination of the stored electronic coins. A register 32 stores the parameter FIRST, which is the lowest serial number of an issued electronic coin of said denomination (e.g. 1), while a register 33 stores the parameter LAST, which is the highest number of an issued electronic coin of said denomination. Registers 34-1 to 34-M form a vector of length M=LAST−FIRST+1 composed of bits, wherein each issued electronic coin corresponds to a bit by the formula SERIAL NUMBER=BIT ADDRESS+FIRST−1. Whenever an electronic coin is removed from pool 13 (e.g. for loading purse 11), the corresponding bit is turned off; when a specific electronic coin is added to pool 13 (e.g. through settlement with drawer 12), the corresponding bit is turned on. In a configuration mentioned above where a small multiple K of each serial number is allowed, the vector is replaced by a matrix of (LAST−FIRST+1) by K dimensions. Any attempt to turn on an already-on bit, will indicate that there is an invalid electronic coin in the system. This provides a simple, low-cost, and efficient means for monitoring the system's security, which is a main objective of the present invention.

FIG. 4 presents a table with numerical calculations, relating to the embodiment under consideration, and to reasonable assumptions about nationwide implementation in the U.S. market. Assuming 150 million cards in circulation (41-1), and $200 in units of 1¢ being the capacity on each card (41-2), and assuming that the total electronic cash in the system can be estimated by the total card capacity (in a realistic snapshot, most cards are only partly loaded, but money is also stored in POS and cash pools), we obtain that the total number of 1¢ electronic coins is $3*10^{12}$ (41-3). A serial number for this range requires 42 bits (41-4). Adding 3 bits per serial number for parity check (41-5) yields the need for 45 bits per each stored elementary electronic coin, when stored on payment cards 2 or POS 3 according to the storage scheme of FIG. 2. This requires to reserve on each purse 11 (which may contain up to 20,000 electronic coins) 900,000 bits (41-7) or 112,500 bytes (41-8). Assuming that the merchant wishes to accumulate $1,000 of electronic cash prior to performing a settlement transaction with a financial institution, he has to reserve in drawer 12 memory for 100,000 electronic coins (41-9) which requires 562,500 bytes (41-11) per POS. The cash pool, needing to monitor $3*10^{12}$ electronic coins, will require (when applying the storage scheme of FIG. 3) this number of bits, or $375*10^9$ Bytes (41-12), which is about 350 GB.

The numeric results of FIG. 4 show that the memory requirements are very demanding for the card and also for many types of POS. Also, payment, settlement and load transactions may take unacceptable average and worst-case times because of the large amount of dataflow.

The following, alternative embodiments will show ways to reduce dramatically the memory and dataflow requirements, thus simplifying, increasing the reliability and reducing the cost of the present invention's implementation.

2.2 A Payment System with Charge and One Electronic Coin Type (FIGS. 5–8)

FIG. 5 is a block diagram illustrating schematically the main element of a preferred embodiment of a payment system according to the present invention. More information on the operation of this embodiment is available in co-pending U.S. patent application Ser. No. 08/533,599 of Sep. 25, 1995, and in an equivalent PCT publication WO 96/09592.

Payment card 51 includes charge card 51-C and electronic coin-0 purse 51-0 for accommodating elementary electronic coins having the value of one EMU (elementary monetary value). Similarly, POS 52 includes charge drawer 52-C to temporarily store therein charge orders made in off-line, and electronic coin-0 drawer 52-0 to store therein elementary electronic coins. The computer system of financial institution 53 includes charge (credit and/or debit) accounts 53-C, and electronic coin-0 pool for accommodating elementary electronic coins.

Reference is now also made to FIG. 6, to illustrate the payment procedure with the embodiment under consideration. A primary concept relating to this embodiment is a parameter $LIMIT, usually defined by the card issuer or the merchant, to specify the minimal amount allowed for charge transactions, e.g. $25.

When a payment card 51 with current amount of $BALANCE in its electronic coin-0 purse 51-0 interfaces with POS 52 (step 61) to pay an amount of $SUM, $SUM is compared to $LIMIT (step 62) to decide whether the payment can be made via charge card 51-C (step 64 transaction 54). If not, payment is referred to purse 51-0. In step 63, $SUM is compared to $BALANCE to find out whether payment can be made from the amount stored in the purse (step 65, transaction 55); if not (step 66). $LIMIT will be paid by charge card 51-C to charge drawer 52-C, and change of $LIMIT–$SUM is transferred from drawer 52-0 to purse 51-0 (transaction 56).

The payment procedure of FIG. 6 has the following advantages:

(a) payment can always be made for any amount, limited only by the charge card's ceiling; no manual loading of purse 51-0 is ever required in this embodiment;

(b) the value stored in purse 51-0 will not exceed $LIMIT, which minimizes the damage in case of loss;

(c) for any specific POS 52, the average amount of electronic coin inflow through payment transaction 55, equals the average amount of electronic coin outflow through change transaction 56. This means that electronic coins actually revolve among cards and POS.

Returning now to FIG. 5, in settlement transaction 57, charge orders received from customers through transactions of steps 64 and 66 of FIG. 6 are submitted for clearance with the respective accounts in charge accounts 53-C. Transaction 59 provides the initial amount of electronic coins to a payment card, prior to supplying the card to the customer. In the embodiment under consideration, no additional transfer of electronic coins between financial institutions and customers is ever needed. In transaction 58, four procedures are carried-out regarding electronic coin flow between the POS 52 and financial institution 53:

(a) Priming: as electronic coin drawer 52-0 must always have sufficient amount of electronic coins for returning change to purse 51-0 (step 66 of FIG. 6), some amount of initial electronic coins must be supplied to the drawer before starting a business cycle (e.g. a workday); this amount is acquired by the merchant from the financial institution and transferred from pool 53-0 to drawer 52-0. Priming with about 15% of the expected electronic coin revenue during the business cycle proves to be effective for flawless operation with very high probability.

(b) Adjustment: at the end of the business cycle, the amount of electronic coins in electronic coin drawer 52-0 is expected, statistically, to be unchanged in respect to the initial amount. However, due to statistical fluctuations, the actual amount would usually require small addition or subtraction in order to start the next business cycle with a predefined amount of electronic coins for priming.

(c) Monitoring: in order to check the security of the system at pool 53-0, an amount of flow from drawer 52-0 must be ensured. The natural flow through adjustment transactions might be sufficient, or some additional exchange of electronic coins between drawer 52-0 and pool 52-0 may be initiated during the routine communication between the POS and financial institution, made for other transactions from 57 and 58 (monitoring is discussed in greater detail hereinbelow).

(d) Refresh: if both an old and a new edition of electronic coins are used, old electronic coins can be intentionally drained from POS to financial institution during routine communication (refreshing is discussed in greater detail hereinbelow).

It is noted that all transfers of electronic coins described above, through transactions 55, 56, 58 and 59 of FIG. 5, involve moving the serial number of each transferred electronic coin, as described with reference to FIG. 1 to which reference is now made.

FIG. 7 calculates the amount of storage and transfer of information needed for the implementation of the embodiment under consideration. Assuming 150 million cards (71-1) (as in FIG. 4), accommodating up to $25 each, which are 2500 1¢ electronic coins (71-2). The total number of coins is estimated as the total number of cards multiplied by each card's maximal capacity (actually, half of this amount will reside on cards, while the remainder will be in POS drawers and financial institution pools), which leads to 375 billion electronic coins (71-3) which require 39 bits for a unique serial number (71-4). Adding 3 parity bits, we obtain 42 bits per each electronic coin serial number. For 2500 electronic coins, this means 13,125 bytes per payment card. A POS accommodating up to $1000 in 1¢ electronic coins will require 525,000 bytes of memory for recording their serial numbers (71-11), while a cash pool allocating 1 bit per electronic coin (memory management according to FIG. 3), will need 48,875 million bytes (71-12).

The memory requirements represented by the results of FIG. 7 are easily acceptable to financial institutions and POS, and feasible, yet still demanding, for cards. Further reduction of the data storage and flow requirements will be described in the embodiments hereinbelow.

Reference is now made to FIG. 8, which is a detailed block diagram illustrating in more detail the embodiment of FIG. 5. Payment card 51 includes elementary electronic coin purse 51-0 and charge card 51-C. Purse 51-0 includes an electronic coin denomination register 51-D, a total balance register 51-B and a memory 51-L accommodating the serial numbers of all electronic coins currently stored in purse 51-0. Charge card 51-C includes an account info register 51-A with the information required to access and perform transactions with the respective account from charge accounts 53-C at respective financial institution 53. External interfacing 51-E allows card 51 to interface with points of sale 52, through interface means which may use contact, contactless or remote communication links. POS 52 includes a card interface 52-2 to interface with payment cards 51 and a customer interface 52-4 to allow the customer to key-in parameters such as a PIN code for charge transactions. A payment amount register 52-3 receives the payment amount from a calculation unit 52-6 which determines the purchase contents and its price by receiving signals from a purchase interface 85, which may be a keypad, bar-code scanner, vending machine controller etc. An automatic transaction manager 52-1 performs the transaction procedure of FIG. 6 upon receiving the amount due from register 52-3 and the electronic coin purse parameters from card interface 52-2. Automatic transaction manager 52-1 activates: an electronic coin payment unit 52-8 to receive payment from purse 51-0 and deposit the payment in electronic coin drawer 52-0; an electronic coin change loading unit 52-10 to return change to electronic coin purse 51-0 from drawer 52-0; and a charge transaction unit 52-7 to charge the respective account in charge accounts 53-C in accordance to charge card 51-C. Charge drawer 52-C accommodates charge transaction orders until settled with financial institutions 53. The computer system of financial institutions 53 maintains charge accounts 53-C and electronic coin pools 53-0, for transactions 57, 58 and 59 of FIG. 5.

2.3. A Payment System with Charge and Two Electronic Coin Types (FIGS. 9–10)

The embodiment illustrated in FIG. 9 to which reference is now made, reduces the amount of data storage and transfer, in comparison to the embodiment of FIG. 5 described hereinabove. In this embodiment, an electronic coin purse 91-s is subdivided into an electronic coin-0 purse 91-0 containing elementary electronic coins of one EMU value, and an electronic coin-1 purse 91-1 containing electronic coin-1 coins, whose denomination is a predefined integer number of EMU (elementary monetary unit). An electronic coin drawer 92-S and an electronic coin pool 90-S are subdivided similarly. Each sub-stored-value device can contain only the respective type of electronic coins, and electronic coin transactions between devices transfer electronic coins only between matching sub-stored-value devices.

The transaction procedure for multiple electronic coin type purses will be described hereinbelow:

The embodiment of FIG. 9 operates with similar efficiency to the embodiment of FIG. 5. The purse subdivision can be left transparent to the card holder and merchant.

Each electronic coin sub-level perform individually with a similar behavior as the single electronic coin level of FIG. 5. Thus, the inflow and outflow of electronic coins at each sub-level are statistically equal in average.

FIG. 9A describes a $25 charge transaction minimum limit using the procedure) and an electronic coin purse subdivided to accommodate a maximum number of 24 $1 electronic coins and 99 1¢ electronic coins. The quantities 24 and 99 are determined according to criteria described hereinbelow. These quantities are exemplary without in any way restricting the scope of the invention. FIG. 10A calculates the amount of data needed to be stored and transferred during transactions. It can be seen the card now needs only 563 bytes for electronic coin storage, the POS makes do with 8,956 bytes, and the financial institution can now use even a personal computer for storing the entire electronic coin pool status.

FIGS. 9B and 10B are similar to FIGS. 9A and 10A respectively using 50¢ electronic coins (instead of $1 electronic coins for electronic coin-1.)

2.4. A Payment System with Three Electronic Coin Types (FIGS. 11–12)

Figures 11, 12:
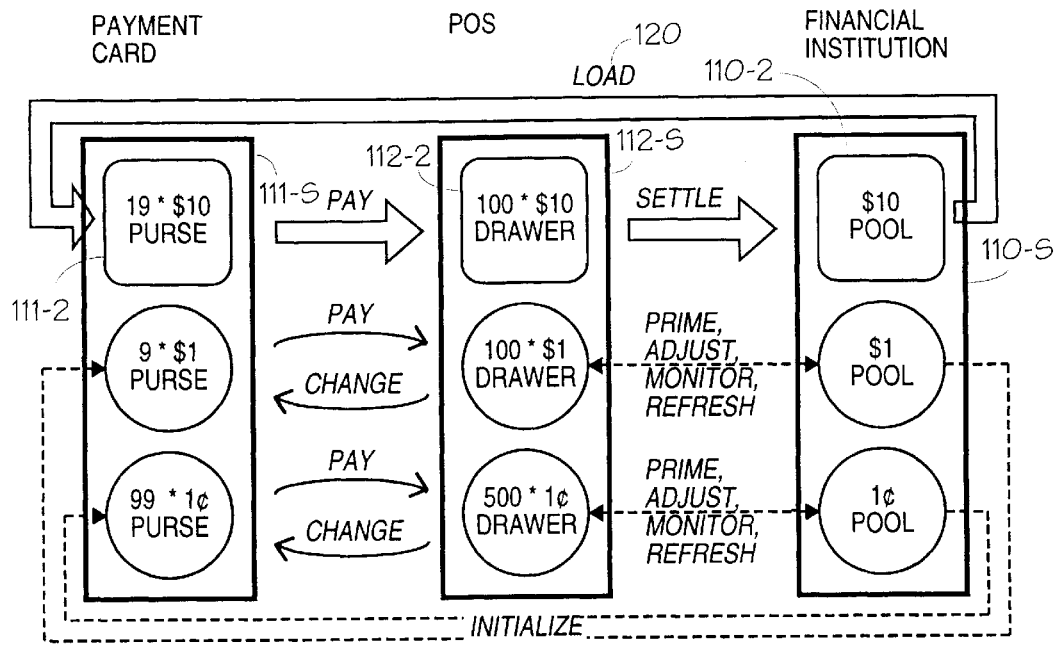
FIG. 11 is a block and flow diagram illustrating the structure and operation of a further preferred embodiment of the present invention.
FIG. 12 is a table illustrating the calculation of the memory requirements for the embodiment of FIG. 11.

FIG. 11 illustrates electronic coin storage, using a payment card and an electronic purse and allowing automatic payment and change transactions at the POS according to FIG. 6. functions, without including charge functions in the transaction options.

The rules for establishing and operating a multiple electronic coin type system are described hereinbelow, FIG. 11 illustrates a system, where each payment card can accommodate any amount between 0 to $199.99 in electronic coins of $10, $1 and $1¢. (These values are not optimal; actually, for a $200 purse, electronic coins with denominations of $7.84, 28¢ and 1¢ would yield even better results but could be confusing.) The results shown in FIG. 12, show that for 150 million cards, each carrying a maximum of almost $200, 581 bytes on the card would be sufficient for storing all electronic coins, while minimal storage requirements are expected also from the POS and financial institution computers.

An additional important aspect, shown in FIG. 11, is the loading doctrine. Loading in a "pure" stored-value card, i.e. a card without a charge function, requires payment by any means to a terminal connected to the financial institution, and transferring electronic coins (each with its serial number) therefrom into the respective sub-purse. It is both reasonable and efficient to allow such load transactions only with the higher denominations of coins or even with the single highest denomination. Electronic coins of denominations allowed for loading will also be called electronic bills, and their respective storage device will be presented in the drawings as a rounded-corner square (see 111-2, 112-2 and 110-2 of FIG. 11.) As bill be illustrated hereinbelow electronic bills revolve mostly in the circle pool-purse-drawer-pool, the lower electronic coins (not permitted for loading) revolve mostly between purses and drawers.

Figure 13:
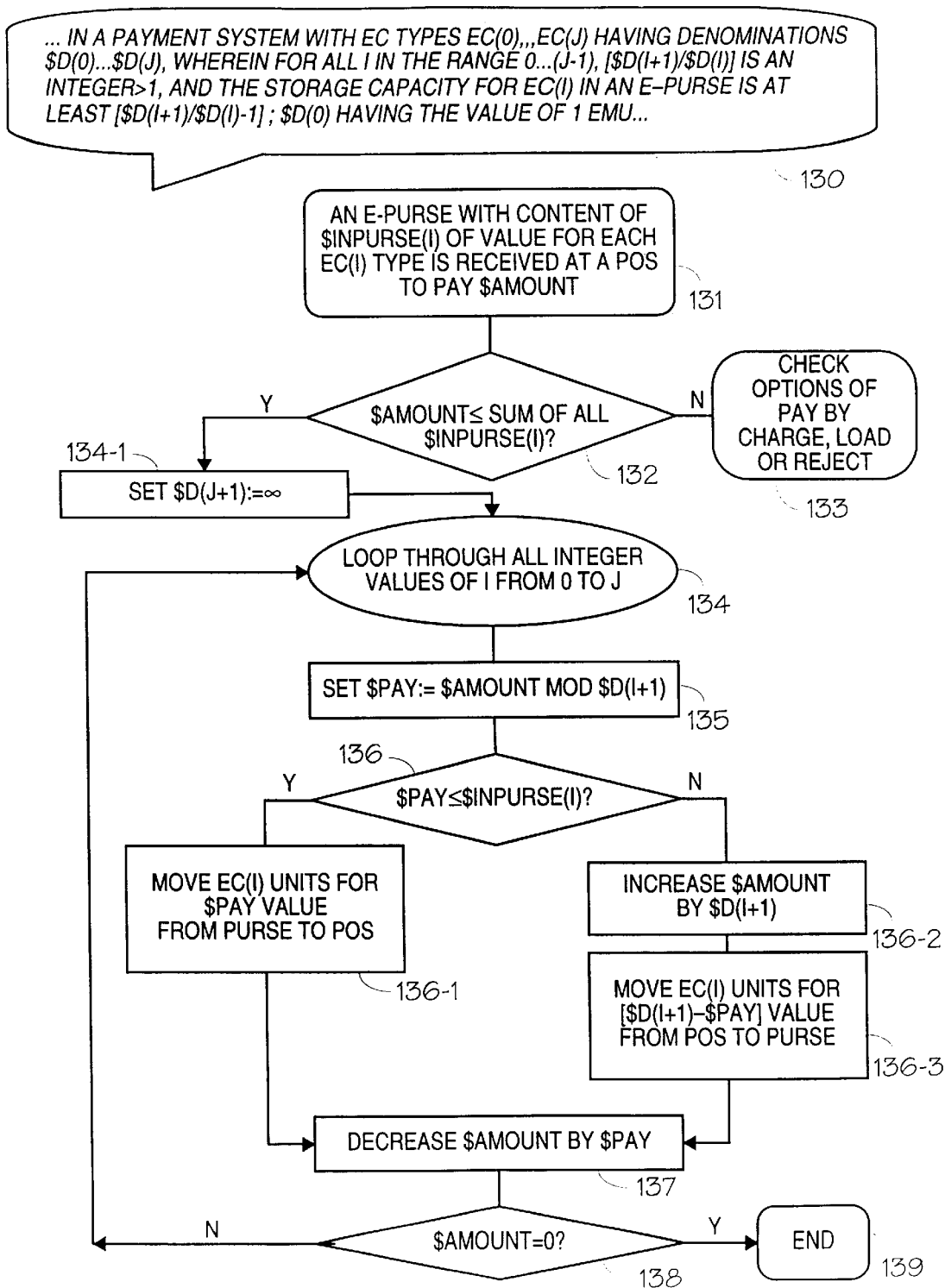
FIG. 13 is a flowchart illustrating the electronic cash payment procedures in the embodiments of FIGS. 9, 11, 14 and 17.
Figure 14:
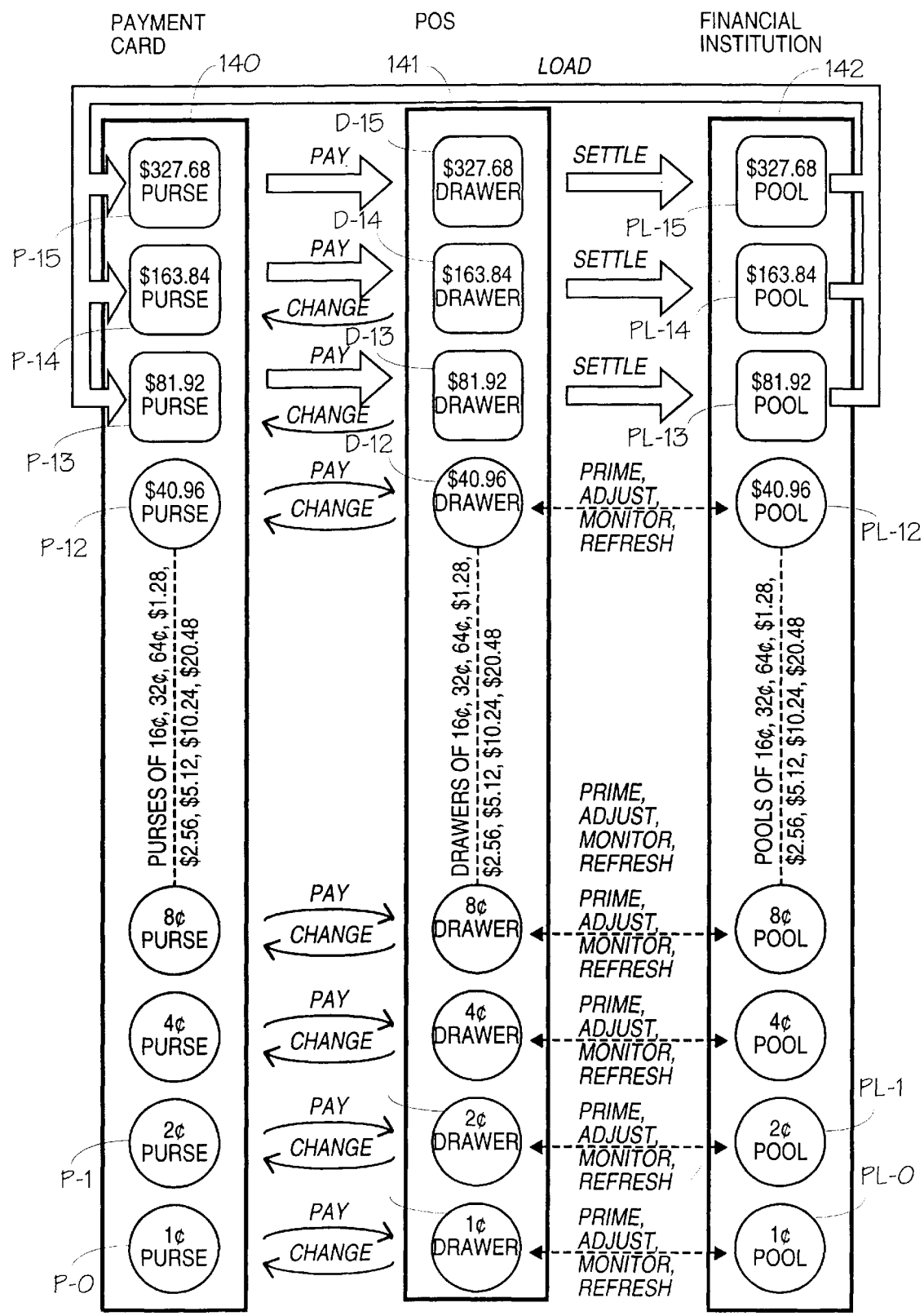
FIG. 14 is a block and flow diagram illustrating the structure and operation of a further preferred embodiment of the present invention.
Figures 15, 16:
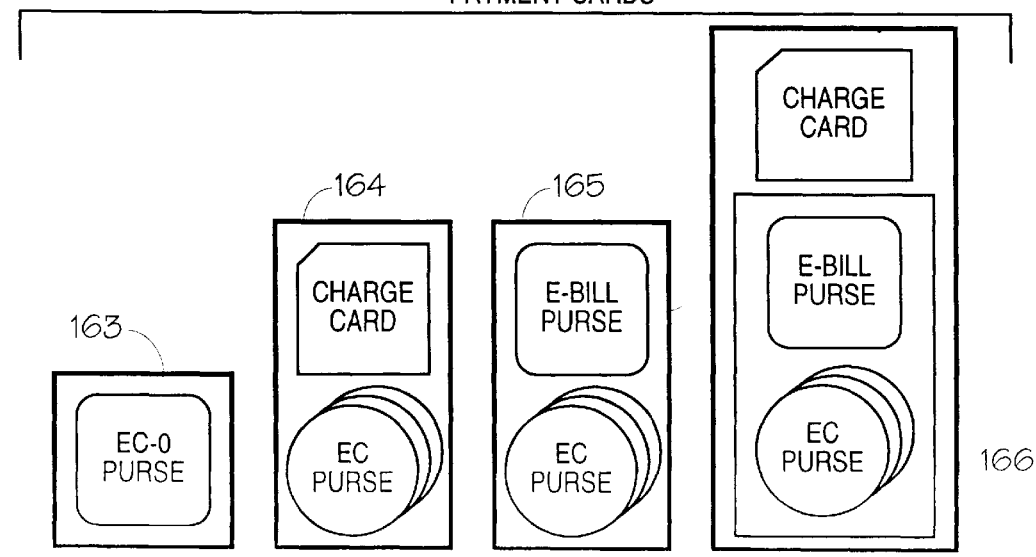
FIG. 15 is a table illustrating the calculation of the memory requirements for the embodiment of FIG. 14.
FIG. 16 is a block diagram illustrating a farther preferred embodiment of the present invention.

2.5 A Payment System with Multiple Electronic Coin Types (FIGS. 13–15)

A multiple electronic coin type system is devised to allow payment of any multiple integer of EMU (elementary monetary unit), with a small number of electronic coins. Following is a description of such a system using J+1 types: electronic coin(0) . . . , electronic coin(J), of different denominations SD(0) . . . SD(J), assuming monotonic ascending order. All values described hereinafter are in terms of a common, minimal monetary unit, e.g. 1¢; thus $200 is actually represented as 20,000¢.

The following parameters are preferred for optimal operation:

(a) $D(0) equals one EMU.

(b) R(I)=SD(I+1)/$D(I) is an integer>1 for all $0 \leq I \leq J-1$.

(c) The memory space allocated in the payment card for electronic coin(I) is R(I)−1 for $0 \leq I \leq J-1$. For electronic coin(J), the allocated space is arbitrary and is the main factor determining the maximum value that can be stored on the card.

(d) The amount of electronic coins of each electronic coin type stored in the POS is considered to be practically infinite.

(e) Payment with electronic coins is executed according to the procedure of FIG. 13, which will now be described.

FIG. 13 is a flowchart describing the payment procedure in a multiple electronic coin type system constructed according to the above rules. A statement 130 repeats the rules. In a step 131, a purse containing value of $INPURSE(I) for each type I (e.g. if electronic coin(3) type has the value of 300¢ and there are 7 electronic coins of this type. $INPURSE(3) will have the value of 2,100.), is presented to pay an amount $AMOUNT (also expressed in 1¢ units). In a decision point 132, the purse contents is checked to see if there is sufficient value for payment. If the answer is "no" step 133 checks for alternative options (e.g. if the card contains a charge card, then the payment alternatives 64 or 66 of FIG. 6 may become valid.), or payment is rejected. Otherwise, in step 134-1, an artificial denomination $D(J+1) is set as infinity (to ensure proper completion of loop and stop at 138 for higher payments; actually, any value larger than $AMOUNT+$D(J) will suffice as "infinity") and then loop 134 through all integer values of 1 from 0 to J starts. In a step 135 the payment $PAY required to be made by electronic coin (I) is calculated, by checking what amount cannot be paid b) the next higher denomination $D(I+1). In decision point 136, $PAY is compared to the available money in this type of coins $INPURSE(I). If the available money is sufficient, this amount is paid in step 136-1 by moving the corresponding amount of electronic coin(I) units (each moving with its serial number) from the payment card to the POS. If the amount is insufficient, then in step 136-2, $AMOUNT is increased by the one next higher monetary electronic coin denomination $D(I+1) and in step 136-3, this transaction is compensated by crediting the card with an amount $D(I+1) in an equivalent amount of electronic coin(I) units. However, as $PAY still needs to be deducted, the end result is a change transaction 136-3. Each electronic coin moved is transferred from the POS to the card with the electronic coin serial number. In step 137, the payment of amount $PAY is deducted from the amount due $AMOUNT, and the procedure continues with the next higher denomination, until completion at exit step 139 from decision point 138.

As mentioned above, in the case that the sum of all $INPURSE(I), checked at decision point 132, is insufficient, it may still be possible to complete the payment by means of a charge transaction, as indicated in step 133, and as also shown in step 66 (FIG. 6). When a charge transaction is carried out in order to make a payment less than the minimum charge amount, the charge transaction will be for the minimum charge amount, and the difference between this minimum charge amount and the desired payment will be returned to the payment card as chance in the form of electronic coins. As previously mentioned, however, it is not possible to send an arbitrary number of electronic coins of arbitrary denomination to the payment card, because the capacities of the individual purses for the different electronic coin denominations are limited. For example, if the 1¢ purse is already filled, then it is not possible to send any 1¢ electronic coins to the payment card. In general, then, sending change to the payment card in the form of electronic coins involves a combination of transfers of electronic coins from the POS to the payment card coupled with transfers of electronic coins from the payment card to the POS. To calculate the correct combination of electronic coins which must be transferred in each direction, it is possible to use the same algorithm described above and illustrated in FIG. 13 as follows:

First, it is necessary that the minimum charge amount be equal to the largest electronic coin denomination multiplied by 1+the number of those electronic coins which the payment card can hold. For example, if the largest electronic coin is worth $5 and the payment card can hold 4 of them, then the minimum charge amount must be $25. This is an easy condition to implement, because the minimum charge amount can easily be adjusted upwards to suit the denominations and capacities of the payment card. For example, if the largest electronic coin is worth $7 and there are 5 of them, then the minimal charge would simply be set at $42. Then, using the algorithm illustrated in FIG. 13, the charge is considered as if it were a "virtual" electronic coin sent from the payment card to the POS. Because there is this additional "virtual" electronic coin, the number of electronic coin denominations is therefore increased from J+1 to J−2, where EC(J+1) is the charge (the "virtual" electronic coin) and $D(J+1) is the minimum charge amount. With these conditions met, application of the algorithm (described above and illustrated in FIG. 13) will result in a transfer of electronic coins such that the payment card will receive the proper change while observing the limits on the number of electronic coins permitted for each denomination.

The set of rules specified above, as well as the flawless operation of the payment procedure of FIG. 13, are based on elementary mathematical considerations. The general problem of selecting objects representing distinct integer values in such a way that their values add up to a specific sum is well-known in the mathematical literature, and is referred to as the "subset sum problem" (sometimes referred to as the "knapsack problem"). It is known that if the represented values (in this case, the denominations of the electronic coins) are predetermined randomly, then the problem is difficult to solve and may not have a solution for every desired sum. On the other hand, if the set of represented values is chosen according to certain conditions, then not only will there always be a solution, but the solution will be very easy to find. The condition which assures that the solution will be easy to find is simply that each object must represent a value greater than the sum of all smaller objects. A set conforming to this condition is known as a "superincreasing set", and the solution, if it exists, can be quickly found by comparison and iteration (as shown in the examples following). The condition which assures that a solution will always be found is simply that each object must represent a value 1 greater than the sum of all smaller objects. A set conforming to this condition is known as a "minimal superincreasing set". For example, the set {1, 3, 5, 5, 5, 23, 47} is a superincreasing set. To find the elements of the set which add up to 34 is easy. First of all, 47 is too large to be present in the subset, but 23 is in the subset. Subtracting 23 from 34 leaves 11. Then it is seen that 5 must be in the subset, leaving 6. Another 5 must also be in the subset, leaving 1. Finally, 3 is too large to be in the subset, and it is seen that the final element in the subset is 1, leaving 0 left over, showing that 34 has a solution. The desired subset is then {1, 5, 5, 23}. On the other hand, there is no solution for a sum equal to 7. As another example, the set {1, 1, 1, 1, 5, 10, 10, 10, 10, 50, 100} is a minimal superincreasing set for which solutions exist for every sum from 1 to 199. An arbitrary number in this range such as 137 can easily be expressed by the subset {1, 1, 5, 10, 10, 10, 100} using the same iterative steps as before. Minimal superincreasing sets are easy to generate by observing the conditions given above. It is readily seen that, in order to function properly, the electronic coin purses of a payment card must constitute a minimal superincreasing set. Some mathematical references which discuss the subset sum problem in detail include *Cipher Systems*, by Henry Beker and Fred Piper, Wiley-Interscience, 1982, pages 373–380; and *Applied Cryptography*, by Bruce Schneier, John Wiley, 1994, page 278.

For best results (i.e. minimal memory requirements in the system, and specifically on the card), two additional rules are preferable:

(1) The ratio factors R(I) would be set equal to each other (this is the reason for 10B bettering 10A).

(2) The number of purses, i.e. J+1, should be maximal but not exceeding the capacity needed to be stored on the card.

Combining these two rules, we obtain the most efficient configuration, which is a binary card with electronic coin denominations of 1EMU, 2EMU, 4EMU, 8EMU etc., each having a single accommodation on the payment card. The following example, in FIGS. 14 and 15 demonstrates the efficiency of a binary card.

FIG. 14 illustrates an embodiment of a payment system according to the present invention, where each stored-value device includes 16 electronic coin sub-storage-devices, for denominations of 1¢, 2¢, 4¢ . . . 32768¢. The payment card can accommodate a single electronic coin for each denomination; the POS and financial institution accommodate a plurality of each. The three highest electronic coin values are selected to have also an electronic bill function, i.e. the card bearer is allowed to make manual loads for values that are an integer multiple of $81.92. When operated according to the procedure of FIG. 13, transaction statistics described hereinbelow with reference to FIG. 21 teaches that the highest electronic coin type ($327.68) will revolve in the cycle pool-purse-drawer-pool; the other two electronic bills ($163.84 and $81.92) will revolve in this cycle with some percentage also in the purse-drawer-purse cycle, depending on the typical loading pattern of consumers (the more consumers tend to load higher electronic bill values, the more electronic bill change of smaller electronic bill values will be observed.) The smaller electronic coins (1¢ to $40.96) will revolve in the cycle purse-drawer-purse.

FIG. 15 calculates the storage requirements for the binary scheme of FIG. 14, for 150 million cards (150-1). The card may accommodate up to one electronic coin of each type, which leads to the estimate of 150 million electronic coins of each type (150-3), requiring 28 bits for a unique serial number for each electronic coin belonging to a specific type (150-4). Adding 3 parity bits (150-5), we obtain 31 bits per type (150-7). Multiplying this number by 16 for the 16 types, and dividing by 8 to convert from bits to bytes, the rock-bottom requirement of 62 bytes per card is obtained. Assuming that a POS is required to provide space for 100 coins of each type, 6,200 bytes of memory will be required for each POS (150-11). As each electronic coin requires a single bit at the financial institution's pool (FIG. 3), 150,000,000 cards multiplied by 16 types and divided by 8 (for bit-to-byte conversion) yield the number of 300,000,000 bytes storage requirement (150-12) at the pool, which is easily provided by any personal computer's disk.

2.6. A Payment System with a Mixture of Card Types (FIG. 16)

A single payment system according to the present invention may serve a variety of card types. FIG. 16 illustrates a single payment system. In accordance With the preferred embodiment of the present invention a number of electronic coin types are selected for the entire system, according to the rules of described hereinabove. The highest electronic coin level is selected in this embodiment to serve also as electronic bill. That is, manual loading an integer multiple of this coin is allowed. Each POS 160 has a charge drawer and a number of electronic coin drawers according to the system-level selected electronic coin types. Another type of POS 161 omits the charge card function, e.g. for vending machine applications. A computer system of financial institution 162 has charge accounts and a number of electronic coin pools according to the system-level selected electronic coin types. The system serves a variety of payment cards, including electronic coin-0 purses 163 (see also FIG. 1), combination charge/purse cards 164 with auto-reload function (see also FIGS. 5 and 9), multi-stage "pure" purse cards 165 where reloading is limited to the higher value electronic coins only (see also FIGS. 11 and 14). The system also serves payment cards 166, where the card allows reloading by either manual reload of the electronic bill purse (such an intentional reload is important if the consumer wishes to make purchases under absolute anonymity and privacy), or automatically from his charge card according to the scheme of FIG. 6, for maximum convenience.

2.7. The Recommended Payment System (FIGS. 17–18)

The choice of a "preferred" configuration depends on the needs and preferences of specific environments. One major consideration is efficiency, the other major consideration being friendliness. For example, the most efficient binary, 16-stage system illustrated above with reference to FIG. 16, may be hard to understand to many, and the required reload of integer multiples of $81.92 may be strange and inconvenient.

Figure 17:
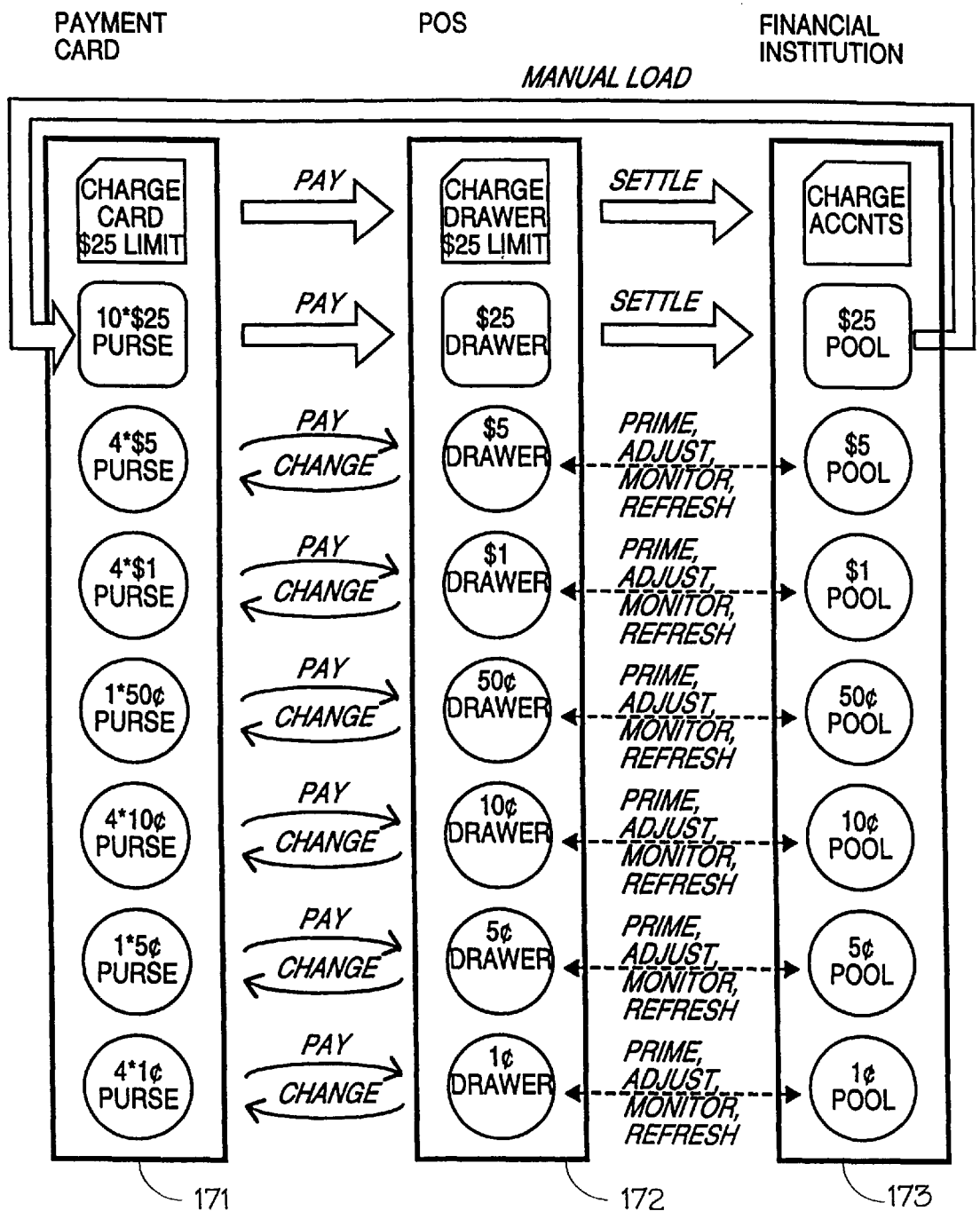
FIG. 17 is a block and flow diagram illustrating the structure and operation of a preferred embodiment of the present invention.

FIG. 17 presents a recommended, multiple stage payment system, constructed according to the rules described hereinabove. Its operation according to FIG. 13 enables two reload options for the customer choice: automatic reload from the charge card according to FIG. 6 for maximum convenience (this will also keep the total electronic coin value under $25), or manual load with integer multiples of $25 for maximum anonymity and privacy (with a maximum purse capacity of $274.99.) Although not an optimal (binary) division among the electronic coin denominations, the selected values show a very efficient performance (FIG. 18), while making use of denominations that are practical to use and easy to understand, as they resemble real-life denominations of conventional coins and bills. (It would be appreciated, however, that except for load transactions, the entire division into separate denominations is merely a technical aspect, which may be kept transparent to consumers and merchants.)

FIG. 18 calculates the storage requirements for the configuration of FIG. 17. The different electronic coin denominations are grouped in line 180-1 according to their multiplicity 180-4, taken from 171 of FIG. 17. The number of cards in circulation 180-3 is assumed to be 150 million. The total number of electronic coins is estimated as the total capacity of all cards (actually, cards are expected to accommodate about 50% of this capacity, while the remainder being distributed among POS and financial institution computers). Line 180-5 calculates the total number of electronic coins for each of the group members of line 180-1, by multiplying the values from lines 180-3 and 180-4. The number of bits needed for a unique serial number for each card type is calculated in 180-6, and 3 parity bits added at 180-7 to yield the result at 180-8. The size of each group (see 180-1) is presented in line 180-10, for multiplying the numbers from line 180-9 to yield the total number of bits for each group. The total number of bits is summarized in line 180-12, and converted to bytes in line 180-13.

The POS calculation estimates preparing room for 100 electronic coins for each denomination, except the $25 denomination where room for 200 electronic coins is provided. Line 180-14 shows the room for the entire group. When multiplied by the number of bits per each electronic coin from line 180-8, the number of bits is obtained in 180-15, to be summarized in 180-16 and converted into bytes in 180-17.

The financial institution calculation multiplies the total number of electronic coins 180-5 by group size 180-4 divided by 8 (bit-to-byte factor) to yield line 180-18 which is summarized in 180-19.

The numbers derived from FIG. 18 show very reasonable data storage and transfer requirements for a system with 150,000,000 cards, which is sufficient to cover the entire U.S. needs. Expanding the same system to a mammoth 5 billion card system, will result in requiring 137 bytes per card, 3,775 bytes per POS, and about 17 GB for the financial institutions computer system; these numbers reconfirm the feasibility of the present invention for implementation in any desired scale.

2.8. Transaction Statistics

In the specifications relating to FIGS. 5, 9, 11, 14 and 17, it has been stated that the amount of electronic coins of a specified value flowing from cards to a POS as payment, equals in average to the amount of similar electronic coins flowing from same POS to cards as change.

Reference will be made now to FIGS. 5 and 6, and the detailed rules described above, the focus being on decision 63 and transactions 65, 66.

A first important conclusion is that the amount of stored value ($BALANCE) will be maintained smaller than $LIMIT. Even if initially $BALANCE is of a larger value, transactions 65 will deplete the purse until the purse contents is smaller than $BALANCE. Then, in the next transaction, $BALANCE will be either further depleted by 65, or increased by adding change through transaction 66. However, an amount of ($LIMIT–$SUM), added to $BALANCE in 66, equals $LIMIT–($SUM–$BALANCE), which is smaller than $LIMIT under condition 63.

A second important point is that, after a large number of transactions with many purses and many POS (and since neither the consumer nor the merchant have any influence or preference regarding $BALANCE), the value will be a random number evenly distributed between zero and 1 EMU less than $LIMIT.

Therefore, the decision in 63 will yield probability of $SUM/$LIMIT (which is the probability of 63 to be false) to transfer ($LIMIT–$SUM) from the POS to the card, and probability of (1–$SUM/$LIMIT) to transfer $SUM from the card to the POS. The expected value of both directions (obtained by multiplying the transferred value by its probability) is identical, which proves the claim that, on average, pay 55 and charge 56 equal each other.

An analogous discussion with FIG. 13 yields similar results, based upon an analogy between: FIGS. 13=>6: decisions 136=>63; transfers 136-1=>65 and 136-3=>66; and values $PAY=>$SUM, $D(I+1)=>$LIMIT and $INPURSE(I)=>$BALANCE; respectively. This explains why electronic coins actually revolve between electronic coin purses and electronic coin drawers of the same denominations, in all transaction levels of FIGS. 9, 11, 14 and 17 which do not allow manual reload.

3. Editions of Electronic Coins (FIGS. 19–20)

One of the well-known attacks on security schemes is through repetitive attempts to guess the security parameters. The present invention provides an effective countermeasure: issuing a new edition of electronic coins, with a new set of security parameters, periodically (say, each six months), setting an expiration date of the previous edition for a reasonable time after the new edition issues (say, another four months), and devising means at all transaction levels to drain payment cards and POS from electronic coins of the previous edition during all transaction types. These electronic coins are directed into the respective edition's cash pool, where each electronic coin is counted and accounted for. At the expiration date of the edition, the value of all electronic coins that have not been claimed (i.e. all old edition's electronic cash that has been lost or abandoned by card holders) is counted and can be accounted for accurately, which is another object of the present invention.

Figure 19:
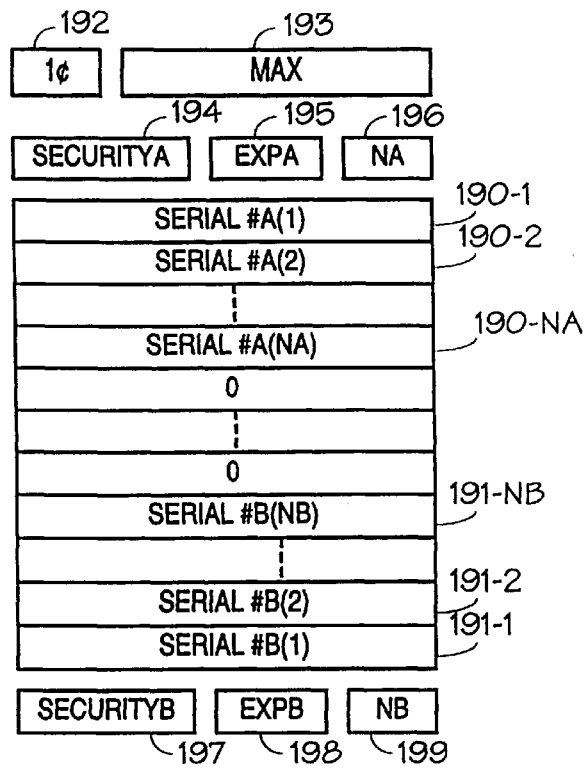
FIGS. 19 and 20 are block diagrams illustrating the memory organization in various stored-value device of the present invention, where two editions of electronic cash are used simultaneously.
Figure 20:
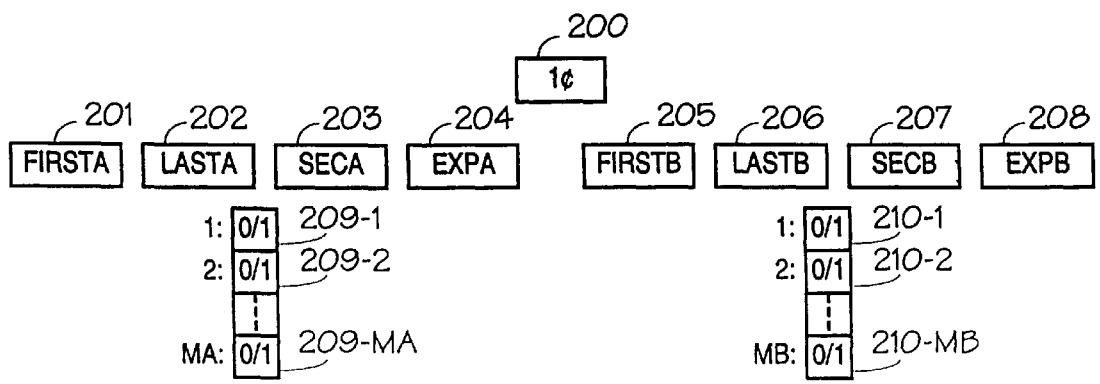

FIG. 19 illustrates data organization in an electronic coin purse for sharing the allocated memory for a specific electronic coin type between two electronic coin editions. A register 192 stores the denomination of the electronic coin type, while register 193 stores the maximum number of electronic coins of the respective type, which can be stored in the card. Referring to the two editions as "A" and "B", registers 194 and 197 contain the security parameters (passwords, signatures, etc.) related to the two editions, registers 195 and 198 include the respective expirations dates while registers 196 and 199 contain the number of electronic coins currently stored from each edition. Registers 190-1 to 190-NA and 191-1 to 191-NB contain the serial numbers for the electronic coins currently stored in the purse. In this way, a minimal memory space (even for a single electronic coin, such as for 50¢ electronic coins in card 171 of FIG. 17) can be effectively divided between two editions effectively. At the POS drawer level, a similar technique can be used to divide the memory space between the two editions, while at the financial institution pool, the two editions are preferably managed separately. FIG. 20 shows a two-edition electronic coin storage of 1¢ electronic coins (register 200), similar to the storage technique of FIG. 3. Registers 201, 202, 205 and 206 contain the limits of issued electronic coins for each edition, registers 203 and 207 contain the security, parameters for each edition, and registers 204 and 208 include the respective expiration dates.

Preferably, whenever electronic coins have to be transferred between cards and POS or between POS and financial institutions, those from the older edition will be selected first, while transfers in the opposite directions, will prefer electronic coins from the newer edition. This will effectively refresh the electronic cash in circulation by draining cards and POS from the older edition's electronic coins and moving them to the electronic coin pools.

4. Money Flow and System-Level Control (FIG. 21)

Preferably, when a monetary system of the present invention is established, all electronic cash will be generated and deposited in one or more electronic coin pools. Then, prior to supplying a new payment card to a consumer, this card will be preloaded by transferring electronic coins from an electronic coin pool to the card. A POS joining the system, will be initially primed with a specified amount of electronic coins, to ensure its flawless operation. After these initializations, electronic money will flow through various transactions as described below.

Figure 21:
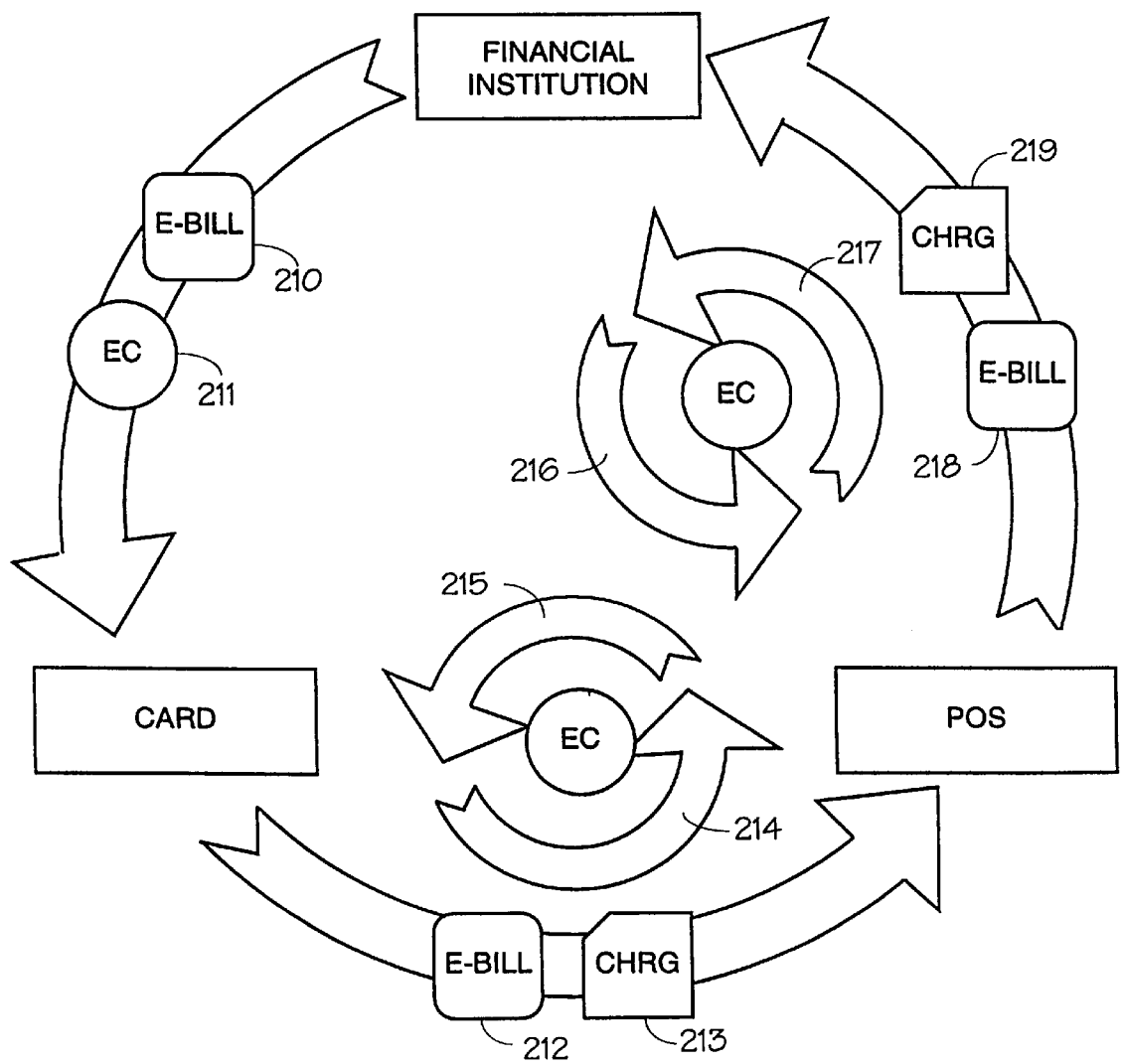
FIG. 21 is a block and flow diagram summarizing the flow of electronic money for the various transactions of the present invention.

The way money flows in the system of the present invention is demonstrated in FIG. 21, in reference to the embodiment of FIG. 17 and the payment procedures of FIGS. 6 and 13.

An electronic bill flow 210 from a pool to a purse occurs when a manual reload of electronic bills (i.e., higher-denomination electronic coins allowed for manual reload) is executed by the user. An electronic coin pool-to-purse load 211 for lower-denomination electronic coins occurs only once per each card, prior to supplying the preloaded card to the user. An electronic bill flow 212 and a charge orders flow 213 from card to POS take place to pay for higher-cost purchases or to automatically purchase smaller-denomination electronic coins (blocks 66 in FIG. 6 and 136-2 & 136-3 in FIG. 13). The POS will communicate from time to time with the financial institution, to initiate a charge order flow 219 and an electronic bill flow 218, for settlement. Electronic coins of smaller denomination than electronic bills, actually revolve between cards and POS: at each small purchase, electronic coins flows from the card to the POS as payment (214) or from the POS to the card as change (215). It has been shown in §2.8 above, that statistically, for each electronic coin denomination, the average flows in both direction are equal, which explains the usage of the term "revolve".

Electronic coins flow (217 and 216) between POS and financial institutions for various purposes:

(a) Priming the POS, before staring a business cycle, with a sufficient amount of each electronic coin type, for having sufficient change to compensate for statistical fluctuations (see 58 in FIG. 5).

(b) Emptying the POS from electronic cash at the end of a business day, if so desired by security consideration or required by law.

(c) Adjusting the amount of electronic coins in the POS between the end of a business cycle and the beginning of the following one; this may be required if the POS is not emptied at the end of a business cycle, to compensate for statistical fluctuations which may cause the amount of electronic coins of each denomination to be substantially below or above the desired amount at the beginning of the next business cycle.

The two electronic coin cycles (214/215 and 216/217), although transferring on the average a zero monetary value, cause a continuous diffusion and mixing of electronic coins among financial institutions, POS and cards. This mixing process has two very important roles:

(a) Security: the mixing process allows a continuous sampling, at the financial institutions' electronic coin pools, of the electronic coins in circulation, to identify invalid electronic coins of each type. Such invalid electronic coins are identified by finding serial numbers out of the issued range (32 and 33 of FIG. 3), or by finding a forbidden repetition of the same serial number. When finding such invalid electronic coins, the mixing process reveals either a system malfunction or a breakdown of security. Also, the number of such invalid electronic coins and the size of the sample, provide a reliable estimate to the overall damage size.

(b) Refreshing: the mixing process allows effectively replacing an older electronic coin edition with a newer one by preferring flow of older electronic coins in the direction of the financial institution.

To enhance the effectiveness of the electronic coin mixing at both the card-POS and POS-financial institution levels, the purse-drawer and drawer-pool transaction procedures will preferably include also the following routines:

(a) The picking of each electronic coin of certain edition and type for transfer from one stored-value device to another, will be made according to preselected picking criteria, such as first-in-first-out or random-picking.

(b) A forced-exchange feature will allow exchange of an equal, selectable number of electronic coins of i selected denomination between two communicating stored-value devices; this will allow the system operator, during normal, routine transactions and transparently to consumers and merchants, to accelerate the draining of an older edition and/or to increase the efficiency and reliability of the security sampling process described above. When used for accelerating the refreshing, such forced exchange will move a selectable number of an old-edition electronic coins of a selected denomination from a purse to a drawer or from a drawer to a pool, while moving the same number of a new-edition electronic coins of the same denomination, from the drawer to the purse or from the pool to the drawer, respectively. When refreshing, devices establish a priority of the transfer of electronic coins of a first edition with respect to the transfer of electronic coins of a second edition, where the priority depends on the direction of transfer with respect to the financial institution. If a first device makes a transfer to refresh a second device that is more "distant" (in terms of the device hierarchy) from the financial institution, the first device sends a new electronic coin to the second device and receives an old electronic coin in exchange. In this way, the old electronic coins have a preferred movement back to the financial institution, where they are collected and retired from circulation. In contrast, when used for accelerating the mixing, a selectable number of electronic coins of the same edition and denomination will be exchanged between a purse and a drawer or a drawer and a pool, on a first-in-first out or random picking basis at each stored-value device.

Following is an example of forced exchange, with respect to the embodiment of FIGS. 17 using the procedure of FIG. 13. Suppose that a payment card performing a payment transaction currently accommodates two old and two new 10¢ electronic coins ("old" and "new" referring to editions,) and two old and two new $1 electronic coins, and according to the procedure of FIG. 13, one 10¢ electronic coin and no $1 electronic coins have to be transferred to the POS. According to criteria downloaded to the POS from the financial institution during a previous transaction, the POS now takes from the card two old and one new 10¢ electronic coins, and returns two new 10¢ electronic coins; the POS also takes from the card one old and once new $1 electronic coins, and returns two new $1 electronic coins. By these forced exchanges, both edition refreshing and coin mixing are accelerated. Similar forced exchanges are executed during routine transactions between POS and financial institutions.

4.1. Duplication-Resistant Electronic Coin Transfer Protocol

Throughout the embodiments of the present invention there is the principle that electronic coins may not be created within a payment card or POS, and, as described herein, the system has features that statistically monitor the electronic coin pools to detect duplicate electronic coins. If no duplicates are detected, the system is assumed to be functioning properly. Otherwise, the system permits the tracing of duplicates back to their point of origin for investigation and corrective action. It is desirable, however, to have an electronic coin transfer protocol that precludes the possibility of a duplication of value. An embodiment of such a transfer protocol is presented herein.

Figure 27A:
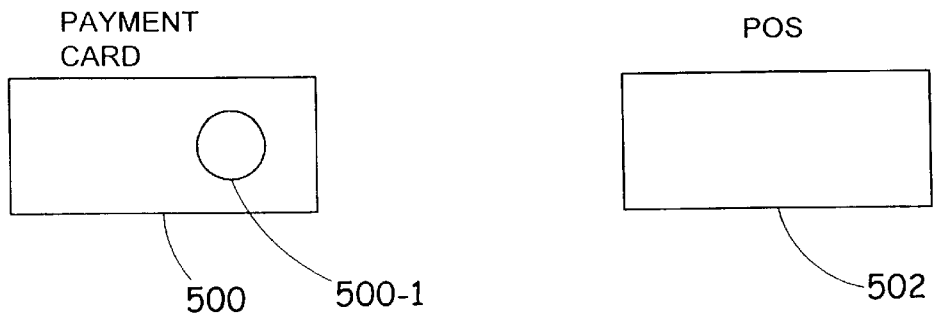
FIGS. 27A, 27B, 27C, and 27D are block diagrams showing the operation of a simple protocol for transferring an electronic coin.
Figure 27B:
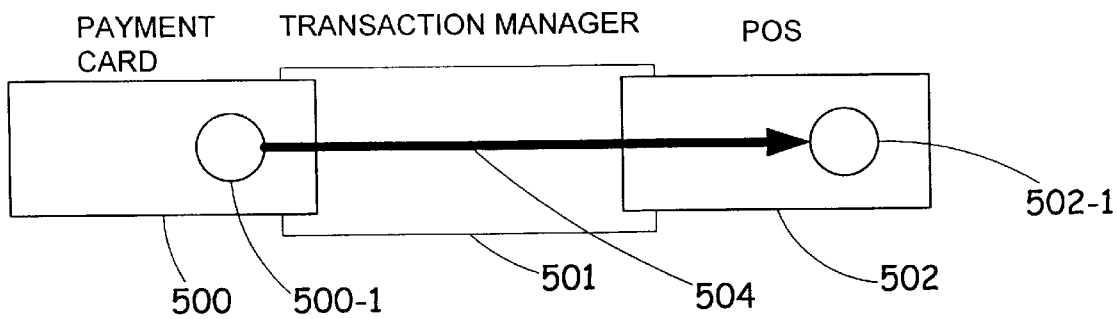
Figure 27C:
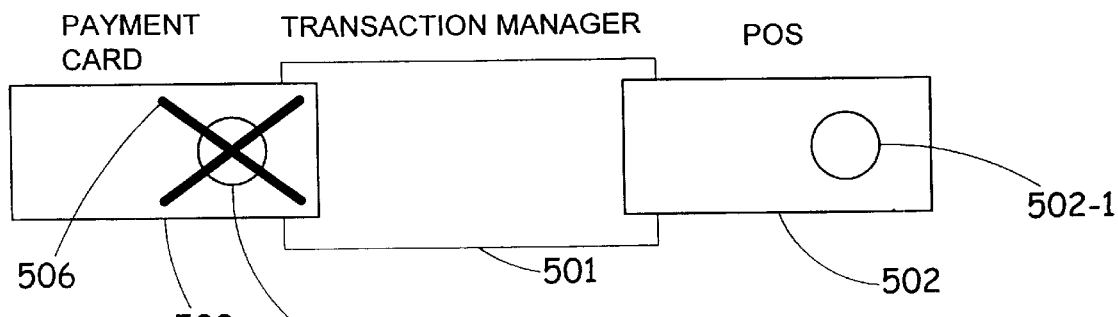
Figure 27D:
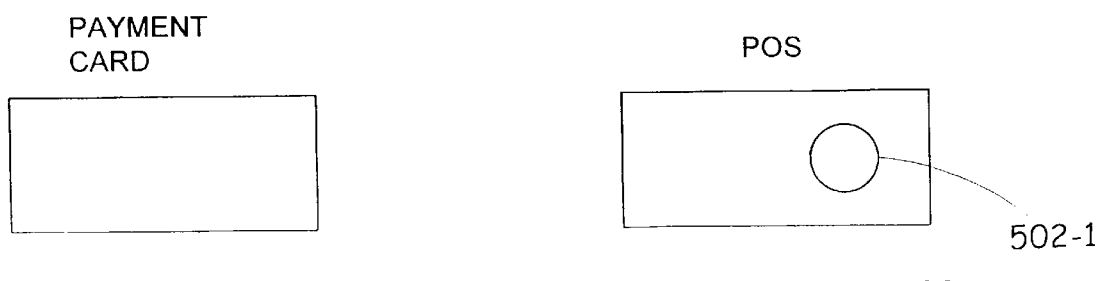
Figure 28:
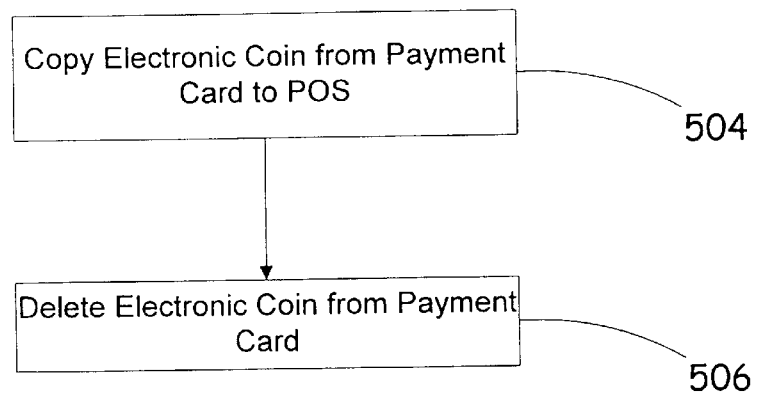
FIG. 28 is a flowchart illustration of the simple transfer protocol illustrated in FIG. 27.
Figure 29:
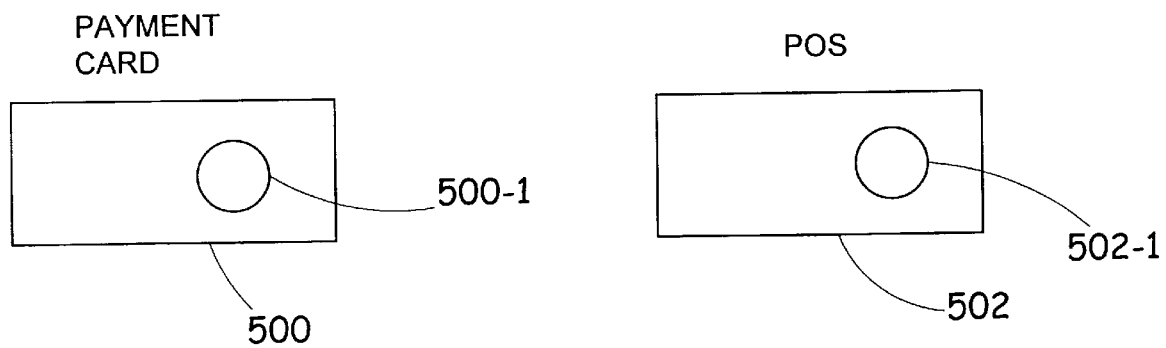
FIG. 29 is a flowchart and block diagram showing a failure of the simple transfer protocol in FIG. 27 and FIG. 28, resulting in the duplication of an electronic coin.

Duplicate electronic coins can be the result of deliberate attempts to create unauthorized value ("counterfeiting"), or could be the result of simple transaction failures. For example, consider the case where an electronic coin is to be transferred from a payment card to a POS using a simple transfer protocol, as illustrated in FIGS. 27A–27D and FIG. 28. A payment card 500 contains an electronic coin 500-1 that is to be transferred to a POS 502 (FIG. 27A). The transfer consists of making a copy electronic coin 502-1 of original electronic coin 500-1 within POS 502 in a copy operation 504 (FIG. 27B), and then deleting original electronic coin 500-1 in payment card 500 with a deletion operation 506 (FIG. 27C). Both copy operation 504 and deletion operation 506 are supervised by a transaction manager 501. After completion of this protocol, original electronic coin 500-1 in payment card 500 has been transformed into copy electronic coin 502-1 in POS 502 (FIG. 27D). Because copies of electronic coins are indistinguishable from original electronic coins in this system, this procedure has the net effect of transferring an electronic coin from the payment card to the POS. The steps of this simple protocol are shown in FIG. 28 and consist of a copy operation 504 followed by a deletion operation 506, as also illustrated in FIG. 27B and FIG. 27C, respectively. Unfortunately, this simple protocol suffers from a weakness in that if anything interrupts the completion of the protocol, there is the possibility that multiple copies of a single electronic coin will exist. For example, suppose payment card 500 is disconnected from transaction manager 501 after copy operation 504 has taken place, but before deletion operation 506 has taken place. This could happen through a number of natural and possible events. In addition to a genuine power failure which disables transaction manager 501, a consumer might suddenly withdraw his payment card from the POS prior to the execution of the deletion operation, either innocently without realizing the effect, or deliberately with the intent to induce such a failure. In any case, the result should be that the POS has received an electronic coin credit, but the payment card still has the electronic coin available to be spent again (FIG. 29). In certain prior art implementations of this simple protocol, the electronic coin is "flagged" by the payment card prior to transfer and retains the internal flag in the event of such a failure. This could conceivably prevent the electronic coin from being erroneously considered as a spendable coin, but the information contained in the flag is insufficient to enable an interrupted transfer to be completed.

To eliminate such problems, a transfer protocol can be employed which is fundamentally resistant to electronic coin duplication. One such protocol is illustrated in FIGS. 30A–30I and FIG. 31, also in terms of a transfer from a payment card to a POS, although the protocol is general and would apply equally well in the reverse direction. As with the simple transfer protocol illustrated above, there is a transaction manager, but for clarity in the drawings the transaction manager is not shown in FIGS. 30A–30I or FIG. 31. It should first be noted that a monetary transfer is generally defined as a "transaction" in which one account is credited with a certain amount and another account is debited with the exact same amount. Transactions are "atomic" or "indivisible" in that (ideally) either the entire transaction is executed or no part of the transaction is executed. In on-line systems, for example, a provision is made either to "commit" the transaction (to transform both accounts to the state of the executed transaction) or to "roll back" the transaction (to return both accounts to the states they were in prior to the initiation of the transaction). Traditionally, in the event of an interruption of the transaction (such as by a power failure), the "roll back" option is taken, in which case the transfer was unsuccessful. The transfer could be attempted again, or it could be left unperformed with both accounts as they originally were. The "commit" option is taken only upon the successful completion of the transaction. In either event, the integrity of the system and the accounts involved is protected. In the present case of payment cards and electronic coins, provision for "commit" and "roll back" options would serve to guarantee that the transfer of an electronic coin would be performed completely or not performed at all, and would therefore insure that electronic coins are neither created nor destroyed in the course of transfers or attempted transfers. Unfortunately, current embodiments of the "commit" and "rollback" features require a central administrator (such as a central on-line computer) to oversee the transaction, and this is difficult or impossible to provide in the fluid environment of transfers between payment cards and points-of-sale. Accordingly, in an embodiment of the present invention, cryptographic techniques are employed in the transfer protocol to approximate, as closely as possible within the system of the present invention, a "commit" and a "roll back" option.

Figure 30A:
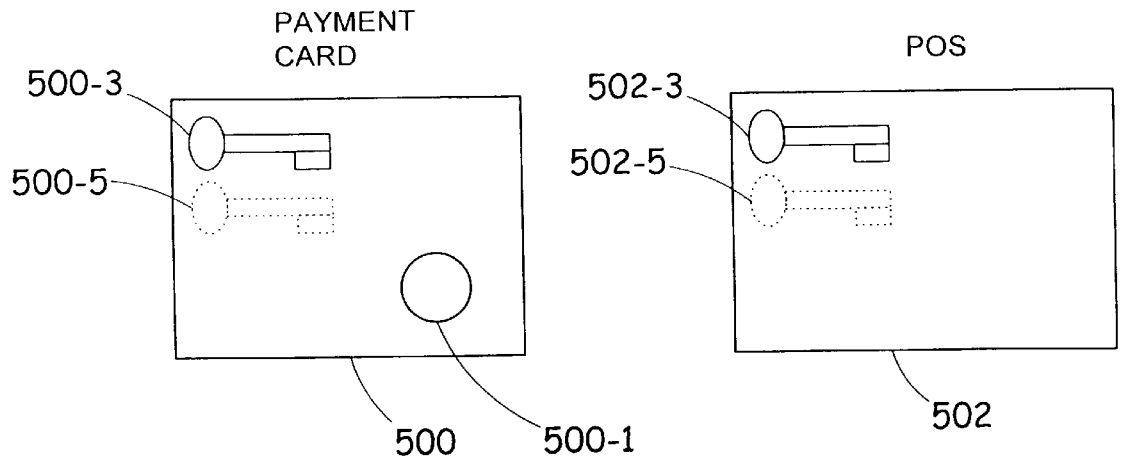
FIGS. 30A, 30B, 30C, 30D, 30E, 30F, 30G, 30H, and 30I are block diagrams showing the operation of a duplication-resistant protocol for transferring an electronic coin.

In this protocol, payment card 500 has a public-private keypair consisting of a public key 500-3 and a private key 500-5 (FIG. 30A). Likewise, POS 502 has a public-private keypair consisting of a public key 502-3 and a private key 502-5. This protocol can utilize any of the suitable public key encryption methods well known in the art. For purposes of this protocol, public keys need not be certified or authenticated, and so either party involved in a transfer may obtain the public key of the other party to the transfer by a simple request to that party. In this protocol, public key encryption serves as a one-way function from the perspective of the sender of an electronic coin, to prevent that electronic coin from inadvertently becoming available for spending a second time by the sender. The coin, however, is not immediately destroyed, but remains for a time with the sender in encrypted form for controlled recovery, in the event that a "roll back" is needed.

In this particular embodiment of the protocol, public key 500-3 and private key 500-5 are not utilized in the transfer of electronic coin 500-1 from payment card 500 to POS 502, but they are shown here because they would be needed for transfer of an electronic coin from POS 502 to payment card 500.

Figure 30B:
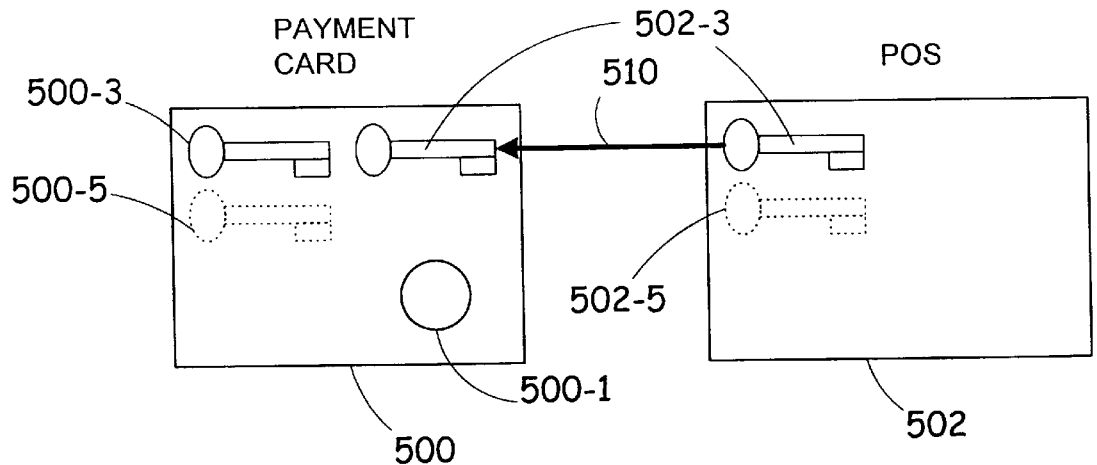
Figure 30C:
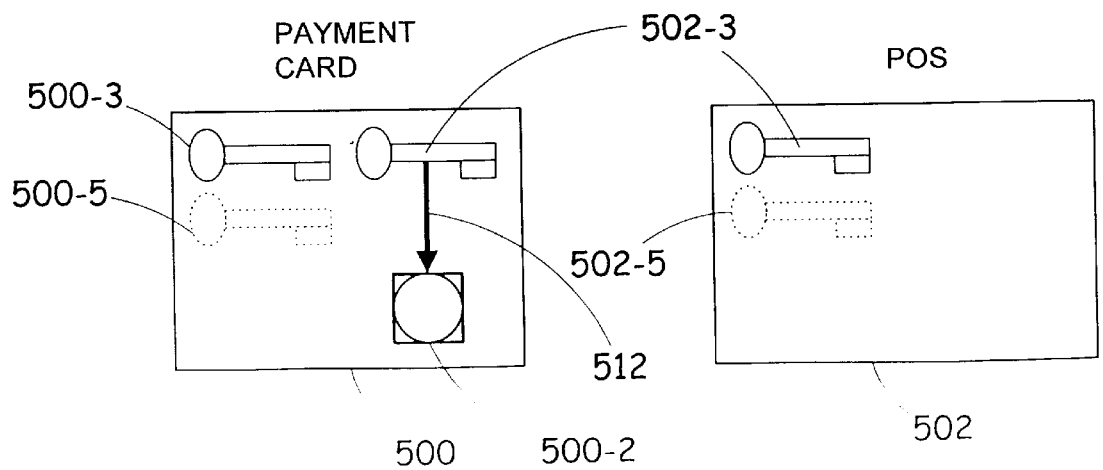
Figure 30D:
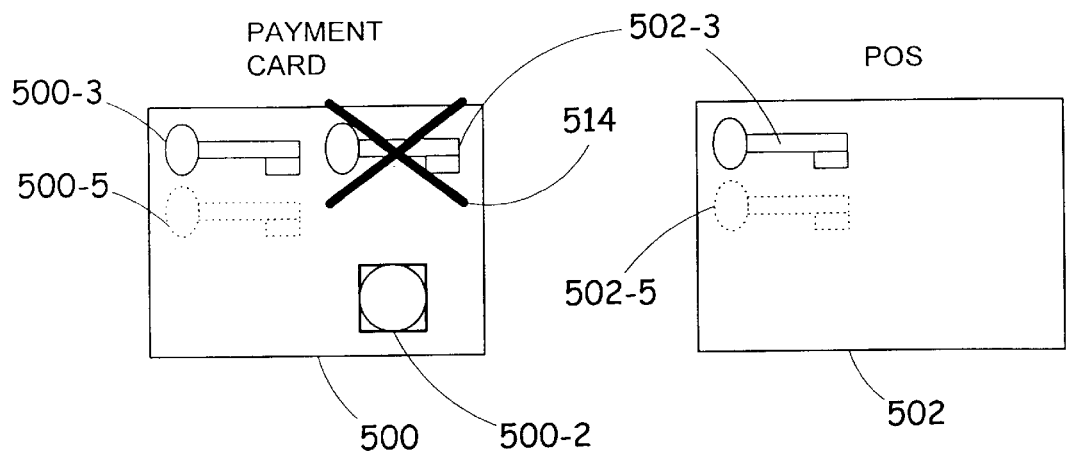
Figure 30E:
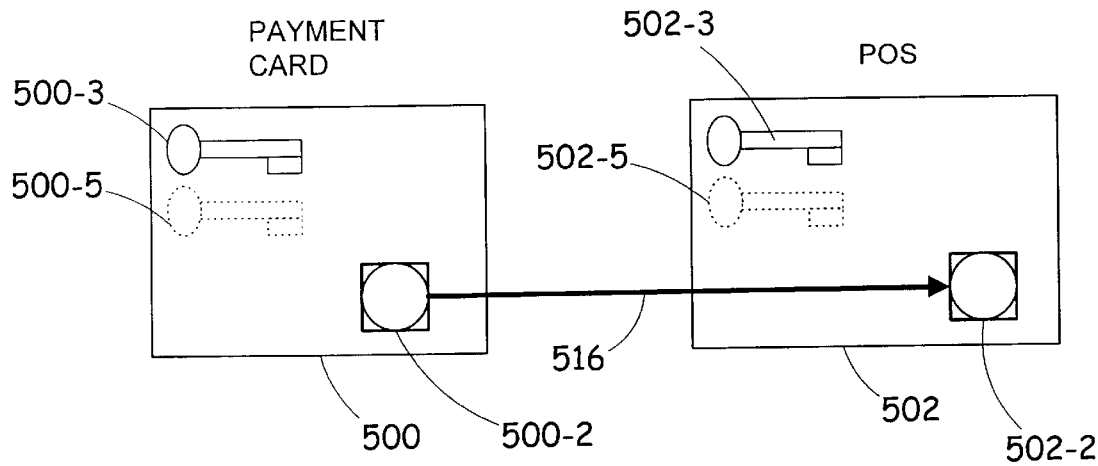
Figure 30F:
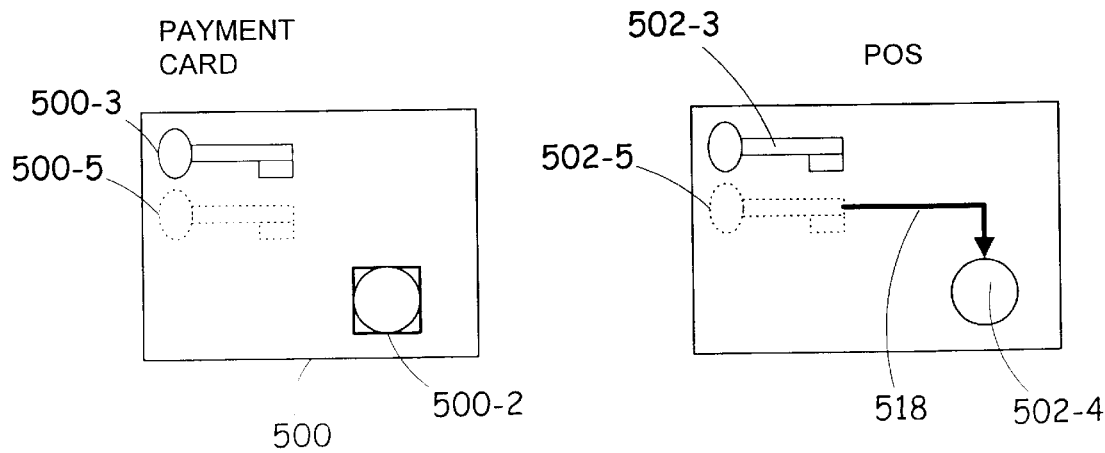
Figure 30G:
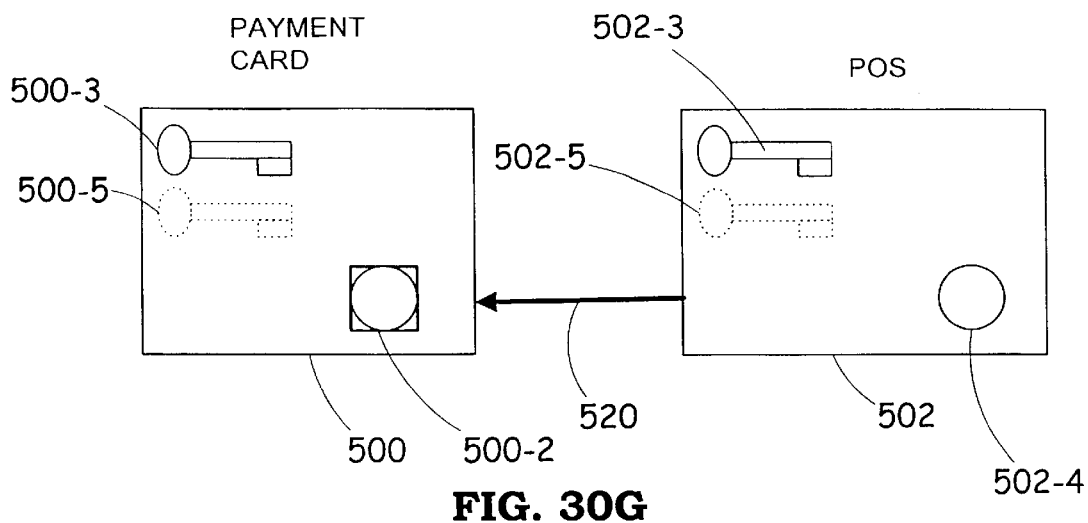
Figure 30H:
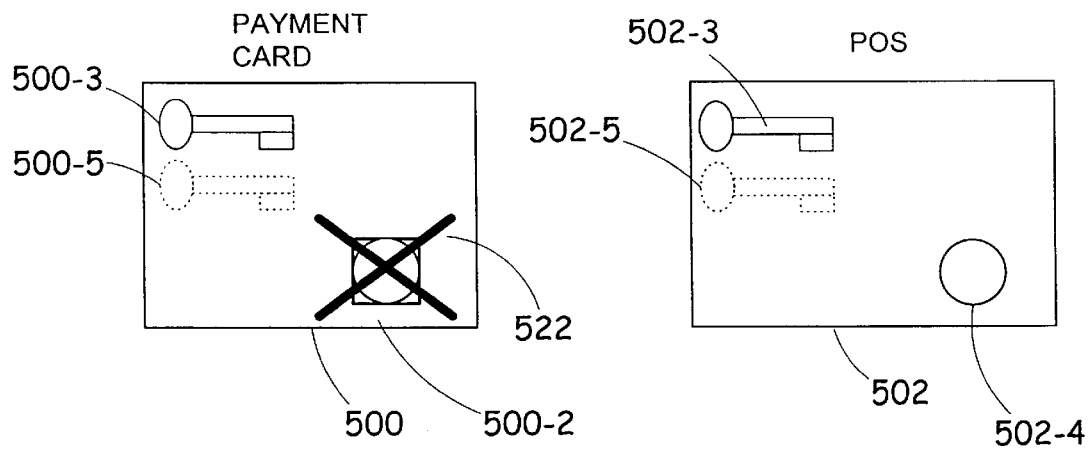
Figure 30I:
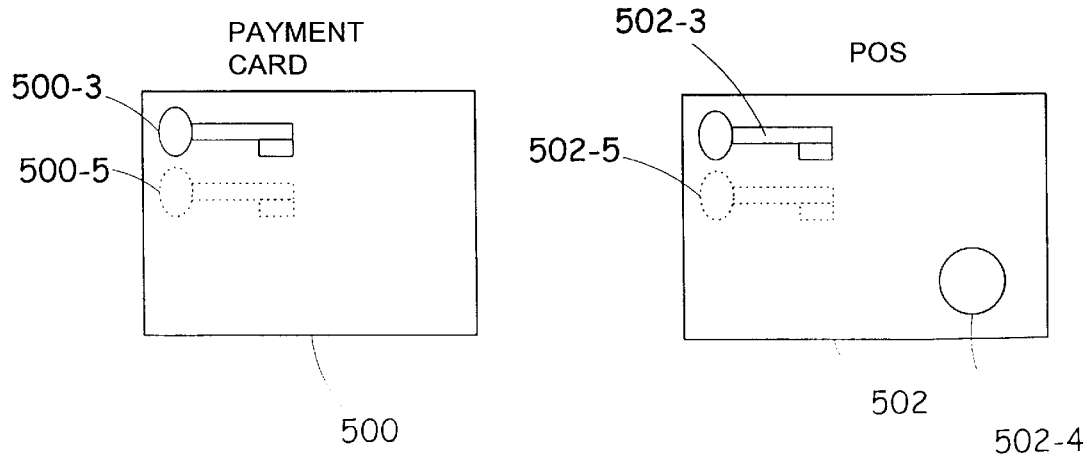

In the first step of the transfer protocol, payment card 500 obtains public key 502-3 from POS 502 in a key-exchange operation 510 (FIG. 30B). In the second step, payment card 500 encrypts electronic coin 500-1 with public key 502-3 to obtain an encrypted electronic coin 500-2 in an encryption operation 512 (FIG. 30C). In a preferred embodiment, this encryption is done "in place" so that electronic coin 500-1 is replaced by encrypted electronic coin 500-2. Thereafter, as far as payment card 500 is concerned electronic coin 500-1 has been effectively "destroyed" so that no copy of it exists which can be used by payment card 500 for any purpose other than the intended transfer to POS 502. Electronic coin 500-1, however, still exists and can be recovered in the event of failure even though it is unavailable for use by payment card 500. In the third step, payment card 500 deletes the local copy of public key 502-3 in a deletion operation 514 (FIG. 30D). In the fourth step, payment card 500 sends a copy 502-2 of encrypted electronic coin 500-2 to POS 502 in a copy operation 516 (FIG. 30E). At this point, two copies of the original electronic coin exist, but neither is immediately usable, since both are encrypted with public key 502-3. In the fifth step, POS 502 decrypts encrypted electronic coin 502-2 with private key 502-5 in a decryption operation 518 to obtain a valid electronic coin 502-4, which is the same as original electronic coin 500-1 (FIG. 30F). In the sixth step of the protocol, POS 502 notifies payment card 500 that it has electronic coin 502-4. in a notification operation 520 (FIG. 30G). In the seventh and final step of the protocol, payment card 500 deletes encrypted electronic coin 500-2 in a deletion operation 522, thereby completing the transfer (FIG. 30H). After completion of the protocol, payment card 500 no longer has electronic coin 500-1, and POS 502 has electronic coin 502-4 (FIG. 30I).

An important property of this duplication-resistant protocol is that at no time does the transferred electronic coin exist in unencrypted form in both the payment card and the POS. This means that inadvertent or deliberate replication of the electronic coin cannot occur. Furthermore, although multiple copies of the encrypted electronic coin may exist simultaneously for a brief period, these are usable only to the intended recipient and cannot create a liability to the system if then happen to persist after the transaction is completed. These encrypted electronic coins could be sent multiple times only to the original intended recipient, and the serial number of the electronic coin can, in principle, can identify multiple transfers of the same coin to the recipient, should this occur, in which case the recipient would ignore the extraneous transfers.

It should be noted that this duplication-resistant transfer protocol assumes that both the sender and the recipient (the payment card and the POS) are trusted, secure devices. This duplication-resistant transfer protocol by itself does not provide protection against duplication of electronic coins by an attack in which an attacker impersonates an authorized sender, such as by presenting a counterfeit or compromised payment card. In such a case, the attacker is clearly not bound by the requirement of the protocol, for example, that the electronic coin be encrypted "in place", and can therefore maintain multiple copies of the same electronic coin in unencrypted form, or may otherwise make unlimited copies of electronic coins. Additional security measures are needed to protect against such attacks, and this transfer protocol should be conducted within a suitably secure environment. For example, the entire session between the payment card and the POS can (and should) be encrypted according to methods well known in the art. The purpose of the transfer protocol illustrated herein is to provide a basis for treating an electronic coin transfer as a transaction in the context of secure devices whose interconnectivity and/or power-dependent operability cannot he guaranteed.

Figure 31:
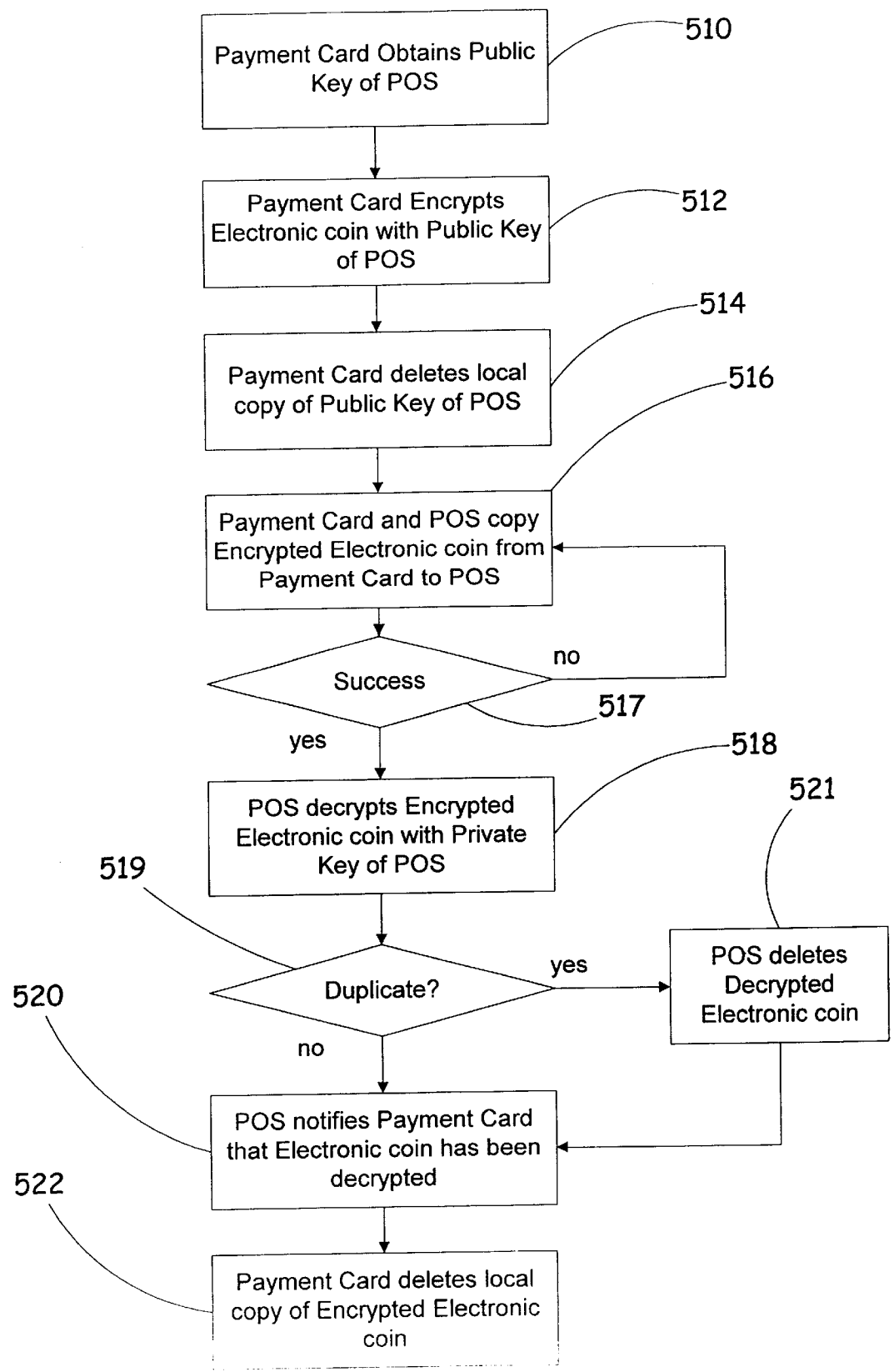
FIG. 31 is a flowchart of the duplication-resistant transfer protocol illustrated in FIG. 30.

Once the electronic coin that is to be transferred has been encrypted with the public key of the intended recipient, it becomes permanently unavailable for any purpose other than sending to the intended recipient. For this reason, although this duplication-resistant transfer protocol provides better recovery from error conditions than the simple transfer protocol illustrated above (FIG. 27 and FIG. 28), true "commit" and "roll back" operations are not directly provided. Rather, the duplication-resistant transfer protocol retains an interrupted transfer in a state that is resumable, and which may be completed at some future time, subsequent procedures can effectively implement the "commit" and "roll back" operations. FIG. 31 illustrates the flow of the duplication-resistant transfer protocol as shown in FIG. 30, with some added features pertaining to maintaining the integrity of the transaction in the event of interruption. For example, after copy operation 516, a decision point 517 checks to determine if the copy has been successful. If not, copy operation 516 is retried. It is important to note that the retry need not be attempted immediately, hut that an arbitrary time can elapse before the retry is made. For example, suppose a customer puts a payment card into a POS (such as a vending machine), but the transfer of the electronic coin from payment card to POS is somehow interrupted, such that the payment card encrypts the electronic coin but the electronic coin is not copied to the POS and therefore remains with the payment card. At a future time, the customer can return to the same POS and complete the transaction or obtain a refund. Suppose, however, that the encrypted electronic coin is successfully copied to the POS but that the transfer protocol is interrupted before the encrypted coin can be deleted from the payment card. In that case, if the customer returns to the same POS to resume the transaction, decision point 519 (FIG. 31) checks to determine if the electronic coin has been previously transferred. If so, the POS deletes the decrypted electronic coin (this electronic coin is a duplicate) and signals the payment card to do likewise. If the electronic coin has not been previously transferred, the transaction resumes and completes normally.

It should also be noted that, although it is unsatisfactory for duplicate electronic coins to be created within the system of the present invention, the occasional loss of an electronic coin is considered to be a tolerable condition. If, for some reason, a transfer is interrupted as described above, but the POS becomes permanently inaccessible to the payment card, there will generally be no way to recover or use the encrypted electronic coin, and thus the electronic coin could be effectively lost. It is possible, however, for the issuer of the POS to maintain a copy of the private key of the POS and thereby make it possible to recover the lost electronic coin from the payment card to take account of such possibilities.

5. Semi-Countable Electronic Monetary System
(FIG. 22–24)

As described hereinabove with reference to statistical analysis of §2.8 and FIG. 21, it has been shown that lower-denomination electronic coins (i.e. electronic coins of denomination which is not allowed for manual purse loading) revolve between cards and POS and between POS and financial institutions with no net long-term effect on the system-level money flow. The money flow has been shown there to take place through transfers of electronic bills (i.e., electronic coins of higher denomination allowed for manual reload) and of charge orders. This behavior allows further simplification of the system of the present invention, by defining the "semi-countable" concept.

"Electronic penny" will be defined as an electronic monetary instrument having the value of one EMU (elementary monetary unit). The electronic penny (herein denoted in the drawings as an "E-Penny" for convenience) is similar to an elementary electronic coin in its payment capability; however, an electronic penny has no serial number, and therefore cannot he traced individually. Its storage is essentially in counter devices, which count the number of electronic pennies stored therein. Transfer of an electronic penny from a source counter device to a target counter device involves incrementing the count in the target counter device, while decrementing the count in the source counter device.

Figure 22:
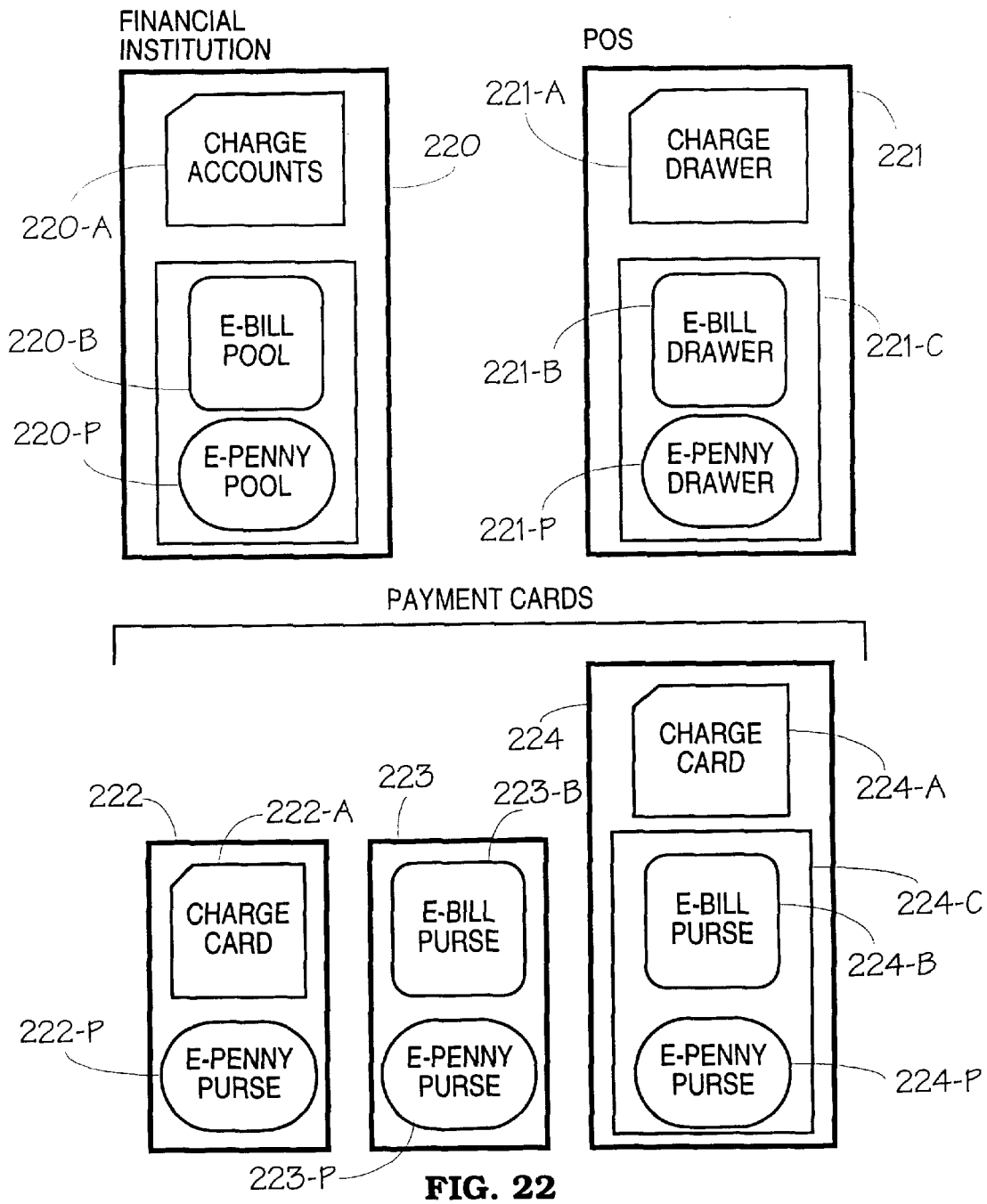
FIG. 22 is a block diagram illustrating another embodiment of the present invention relating to a "semi-countable" feature.
Figures 23, 24:
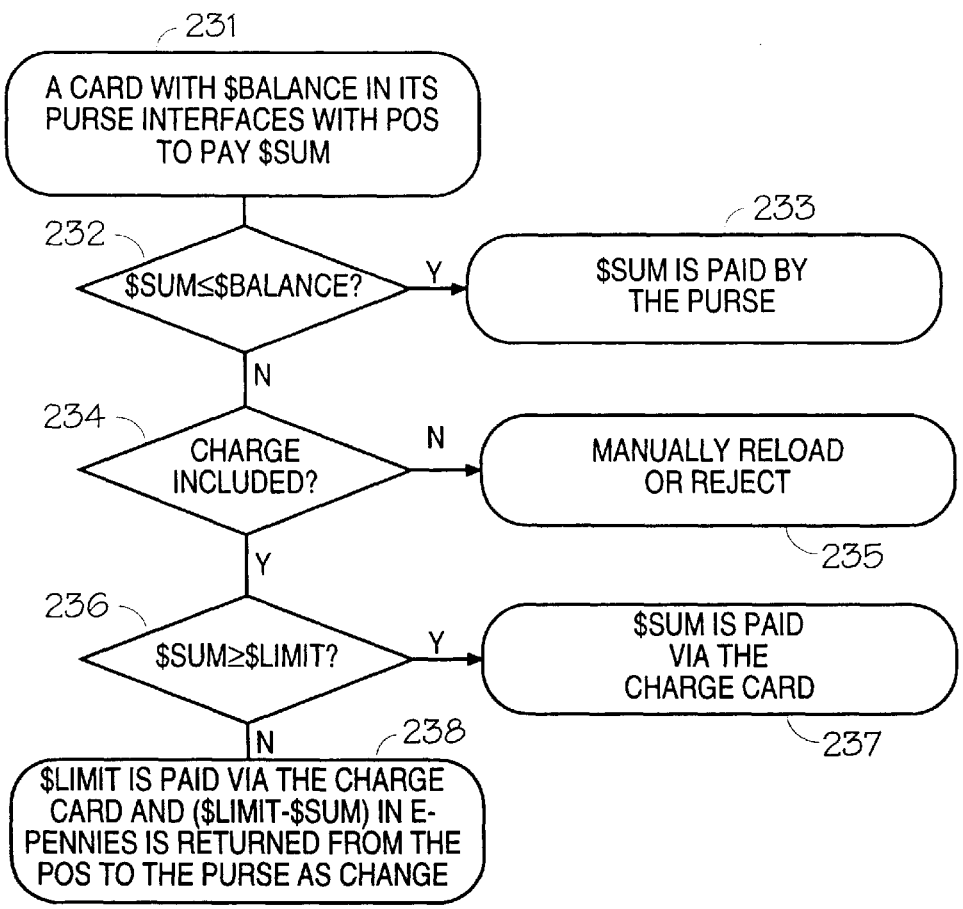
FIG. 23 is a flowchart illustrating the operation of the embodiment of FIG. 22.
FIG. 24 is a table illustrating the calculation of the memory requirements for the embodiment of FIG. 22.

FIG. 22, to which reference is now made illustrates schematically a semi-countable embodiment of the present invention. A financial institution 220 includes charge accounts 220-A, and an electronic bill pool 220-B storing electronic coins of, say $25 each, which are allowed for manual load into electronic bill purses of payment cards. An electronic penny pool 220-P is a counter device, for having therein the number of pennies (e.g. of 1¢ value) currently stored at financial institution 220. A POS 221 includes a charge drawer 221-A for storing therein charge orders received from payment cards. POS 221 has an electronic cash purse 221-C which includes an electronic bill drawer 221-B to store therein $25 electronic coins received from payment cards, and an electronic penny drawer 221-P which is a counter device having the number of 1¢ pennies currently stored therein.

Payment cards 222, 223 and 224 represent three types which may co-exist in the system. Payment card 222 includes a charge card 222-A, having a minimum charge limit of $25 (the charge limit and the electronic bill value are preferably equal, to simplify the operation of the procedure of FIG. 23 below;). Thus, payment cards 222, 223, and 224 can be used to pay amounts of $25 or more; these payment cards also include an electronic penny purse 222-P, which is a counter device having the number of 1¢ pennies currently stored therein. Payment card 223 includes an electronic bill purse 223-B for manually loading thereto and paying therefrom $25 electronic coins; payment card 223 also includes an electronic penny purse 223-P. Payment card 224 includes charge card 224-A, and also has an electronic cash purse 224-C that includes an electronic bill purse 224-B and an electronic penny purse 224-P.

FIG. 23 describes the operation of the embodiment of FIG. 22, for paying an amount $SUM with a payment card having $BALANCE in its purse (step 231), wherein $BALANCE is the sum of the contents of both the electronic bill purse and the electronic penny purse included in the payment card. At a decision point 232, the feasibility of electronic cash payment is checked. If an affirmative decision is found, then in a step 233 $SUM is paid by electronic cash, by any or both electronic bills and electronic pennies with the possibility of payment with electronic bills and receiving change by electronic pennies (see FIG. 13). At decision point 234, payment has been found unfeasible for the current electronic cash in the purse, and therefore payment by charge is checked, i.e. to verify that the payment card is of type 222 or 224, but not of type 223. If charge in not available, then in step 235 the user is instructed to reload his card manually with a number of electronic bills, or else the payment is rejected. At decision point 236, a decision is made to pay $SUM through the charge card, or receive $25 via the charge card and return $25−$SUM in electronic pennies to the electronic penny purse.

Analysis of this procedure, according to the statistical consideration of described hereinabove, yields the following results:

(a) the amount of electronic pennies stored in electronic penny purse 222-P, 223-P or 224-P will be a random number, evenly distributed in the range zero (inclusive) and $25 (exclusive);

(b) the average electronic penny flow into POS 221 equals the average electronic penny flow out of POS 221 so there is no net effect on the money flow.

Consumers are allowed to select three payment cards: 222 for ultimate convenience (no reload option), 223 for unbanked consumers, and 224 for consumers who wish to have both ultimate convenience through incorporating charge card 224-A, but will manually load their electronic bill purse 224-B with sufficient amount of electronic cash, prior to making a purchase where privacy is desired (electronic bill payment is not traceable, while charge payment is traceable).

Bankers may like the present embodiment because of minimal storage and data transfer requirements for both cards and POS. Because memory is allocated only for electronic coin storage of electronic bills (an electronic penny purse counting 2500¢ makes do with a two-byte counter), and assuming the storage of 40 or 80 $25 electronic bills, for accommodating up to $1,000 or $2,000 in each card or POS respectively. FIG. 24 shows that 180 bytes on the card (241-8) and 360 bytes in each POS (241-11) are sufficient. If, however, instead of 40 $25 electronic bills the card will accommodate 1 electronic bill of each $25, $50, $10 and $200 denomination and two $400 electronic bills, the required storage on the card, for an equivalent performance, becomes 24 bytes only.

The security behind the semi-countable concept is based on counting electronic bills as before, while monitoring the electronic penny transaction statistics between each POS and financial institutions, expecting zero average over a long period. Any POS substantially deviating from zero average will indicate a possible flaw in the system's security.

6. Multi-Issuer Environment

More than one financial institution may be involved in issuing electronic cash. In such a situation, a plurality of electronic coin pools shall be maintained in the same system of the present invention. In such situations, a range of separate serial numbers will be allocated to each financial institution. When electronic coins are to be moved from POS to financial institutions (transactions 217 and 218 of FIG. 21), they sill be routed to the respective financial institution according to their serial number. This sorting and routing will take place either at the POS level, or at the level of intermediate processing centers (not shown in FIG. 21), similarly to the techniques used commonly to route charge transactions to the respective financial institutions (219 in FIG. 21).

7. Card-To-Card Transfer

Card-to-card transfer is a desirable feature in any electronic cash system, for enabling person-to-person (e.g. parent to child) transactions. Such transactions were in conflict with "accountable" systems of the prior art, but are supported effectively under the present invention. When two cards interface through a transaction device (essentially similar to purse-to-drawer interface), transfer of electronic coins (each with its serial number) will maintain the integrity of the system under the present invention.

It should be noted, however, that, unlike in the case of card-to-POS transaction where the POS is primed with a sufficient amount of electronic coins of each denomination to enable flawless payment of any amount, card-to-card transactions are limited according to the electronic coins actually stored in both cards, thus a parent having a card of FIG. 17 currently having only two $5 electronic coins, will be able to transfer to his child's card currently storing a single $1 electronic coin, only an amount of $4, $5, $9 or $10.

8. Anonymity and Privacy

It would be appreciated that while there is a tight monitoring on each individual electronic coin in the system, this monitoring does not involve tracking of individual cards or card bearers, thus preserving customer anonymity and privacy, which is an important object of the present invention.

9. Recovering the Value Stored in Lost or Damaged Cards (FIGS. 25–26)

Referring to FIG. 16, card types 165 and 166 allow manual reload of electronic bills. Practically, such manual reloads may reach substantial values, e.g., $500 to $1,000. If a card is lost, stolen or broken, substantial damage may occur to the card owner. According to an aspect of the present invention, such damage may be minimized by recording the serial numbers of electronic bills loaded onto a payment card, and recovering the value of unused electronic bills when these electronic bills expire. Thus, when approaching a loading terminal, e.g. a special ATM, for a manual reload, paving for the loaded electronic bills with any monetary instrument acceptable at this terminal (cash, any charge card, etc.), the serial numbers of the loaded electronic bills are recorded for further possible claims.

Figure 25:
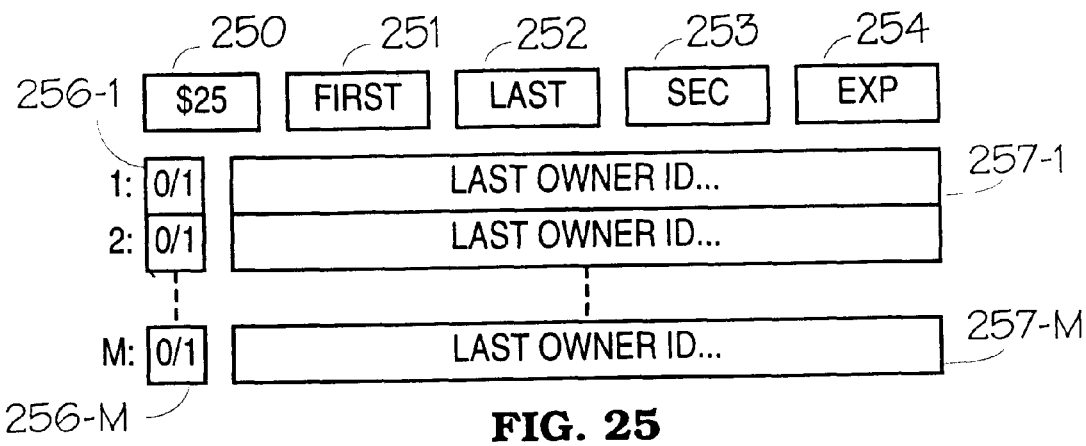
FIG. 25 is a diagram showing the storage of card identification data with respect to electronic bill serial numbers.

FIG. 25 (see also FIG. 20 and the related text) describes a preferred embodiment, where the user identifies himself at the loading terminal, e.g. by his credit card. The user identification data is transferred to the appropriate electronic bill pool related to each loaded electronic bill, where a user ID 257-i is recorded in respect to serial number i, while a status bit 256-i is turned to 0, signaling that the corresponding electronic bill has been moved from the electronic bill pool to an electronic bill purse.

Figure 26:
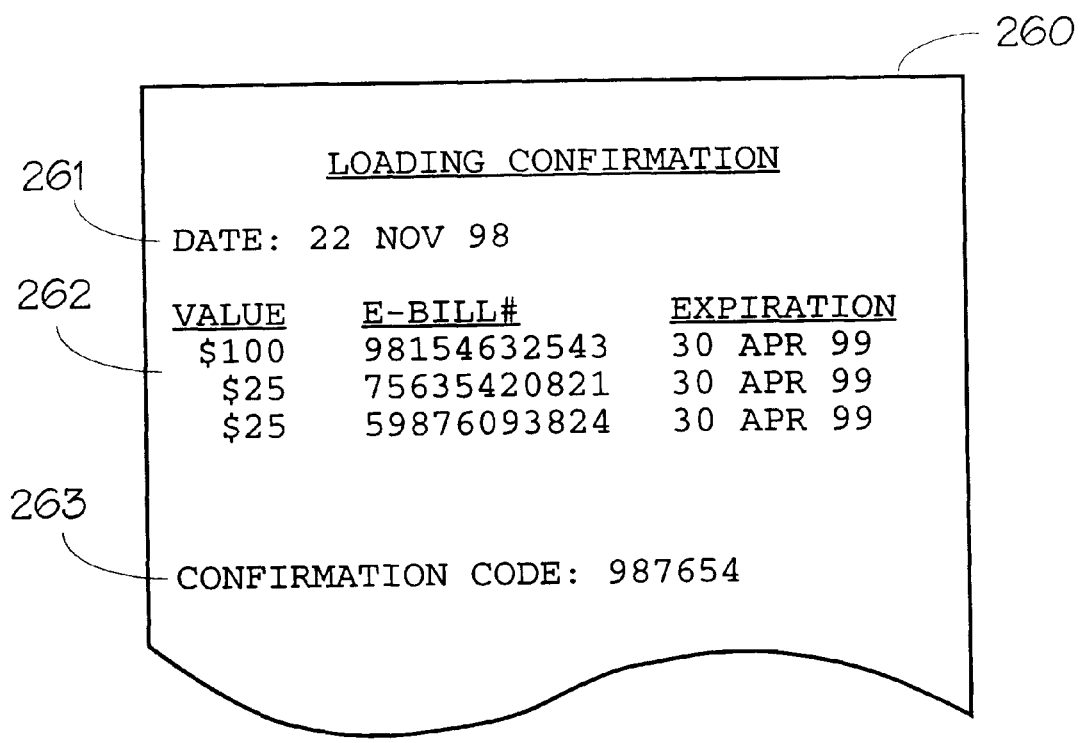
FIG. 26 is a diagram showing a paper confirmation receipt issued by a loading terminal.

FIG. 26 describes another preferred embodiment, where the serial numbers of the loaded electronic bills 262 are recorded on paper slip 260 by the loading terminal along with a loading date 261; a confirmation code 263 is supplied by the terminal or the electronic cash pool, to authenticate the entire slip's information.

Upon the expiration date, unused electronic bills (i.e. electronic bills that have not been returned to the respective electronic bill pool), can be identified automatically by an embodiment of the present invention. In the embodiment of FIG. 25, the original latest ownership of each unused electronic bill with serial number i can be identified from the respective register 257-i; in the embodiment of FIG. 26, such original latest ownership can be determined by the user who presents a slip 260 having the latest loading date 261. Upon receiving, a claim for the value of a lost or damaged card, the financial institution may pay the user the value of the unused electronic bills.

To enhance security in the situation under consideration, a PIN may be required for any transaction that involves spending electronic bills. In this way, the electronic bills in a lost or stolen card will remain unusable, and therefore recoverable on the expiration date.

10. General Comments

It will be appreciated that, for both payment cards and POS units, whenever a plurality of storage devices is mentioned, the present invention relates to logical memory management, and not necessarily to separate chips. For instance, a single hardware chip on a payment card can accommodate a charge card and a number of electronic coin purses.

It would be also be appreciated that whenever an apparatus (payment card, POS or financial institution computer) is described to include separate units to perform separate functions, such separation is basically logic, and several or all functions can be actually executed by a single microprocessor; also, in some cases when two apparatuses are described to interact to execute a mutual function such as transfer of money from one apparatus to another, some of the units described to be included in one apparatus can actually be moved to the other apparatus to perform their function from there.

The parity bits added to each electronic coin's serial number can take into account also the electronic coin's edition and denomination, thus enhancing the system's security and reliability.

The term "serial number" should be interpreted broadly, as any recordable data included in an electronic coin, identifying it and moving with it. It may contain electronic representation of any relevant identification data, such as issuer identification, issue date, expiration date, etc.

11. Extended Security Monitor

The present invention can he expanded and extended to offer a comprehensive electronic cash security scheme as follows (reference is made to FIG. 21):

a. Each electronic bill 210 flowing from bank to card, each electronic bill 212 flowing from card to POS, and each electronic bill 212 flowing from POS to financial institution, including the transaction path via all stored-value devices involved, is reported to the electronic bill pool at the financial institution. Any mismatch is easily interrogated by the data available in the electronic pool. The term "transaction path" denotes the sequence of devices that have engaged in successive transactions with a specific instance of electronic cash, wherein the sequence of devices terminates at a financial institution. The term "intersection", when used with reference to a transaction path, denotes any device which is in common with two or more transaction paths.

b. Card-to-card transfer of electronic bills is allowed for one transfer (or a small number of transfers) only. In this case, the identity of the first card will be concatenated to the serial number, and flow with the serial number up to the electronic bill pool, thus maintaining a complete transaction path tracking.

c. Each POS and each intermediate computer in the settlement chain (normally, transaction information flows from a POS to central banks via several intermediate computers, e.g. local, regional, etc., not shown in FIG. 21), records each received electronic coin alone with the identity of the source device which has supplied this electronic coin. This data is kept, normally passively, for about one month, and then its memory space is freed for further data recording. The embodiments according to the present invention which utilize this data arc discussed in detail below.

d. Each link in the settlement chain maintains a "statistical trap", to measure statistical moments of electronic coins flowing therethrough. Since electronic coin flow statistics are predictable, abnormalities (i.e. exceeding predefined statistical thresholds) will trigger an accelerated refreshing rate at all intermediate computers and POS below the device operating the respective alerting, statistical trap.

e. Any electronic coins having an out-of-range or duplicate serial number that are found in the electronic coin pool, will trigger automatically a systematic query, wherein each device identified as supplying the electronic coin will be queried to provide information on the previous supplier of the electronic coin, down to the respective POS identifying the payment card. The reconstructed path will be used for human interrogation and intervention. The term "invalid electronic coin" herein denotes any electronic coin having an out-of-range serial number or a serial number which is identical to another electronic coin currently in circulation.

11.1. A Continuous Electronic Coin Sampling Watchdog

It will be appreciated that the security scheme described above incorporates complete electronic bill accountability and, at the electronic coin level, a combination of distributed, localized, passive data collection which is normally dormant, with very alert watchdogs (continuous electronic coin sampling; statistical traps). When the watchdog barks, a highly efficient, systematic query identifies the exact transaction path of invalid electronic coins for human intervention. An embodiment of a method according to the present invention for auditing the system to discover the presence and source of invalid electronic coins is described below. The auditing aspects of the method can also be applied to tracing the origin of an electronic cash, including electronic bills, but are illustrated for electronic coins only.

During a certain period of time, a number of transactions involving the spending of electronic coins takes place. It is desired to detect if, during this time period, any of the electronic coins in circulation are duplicates or are out-of-range, and, if so, what is the source of these invalid electronic coins. While duplicate or out-of-range electronic coins, representing unauthorized creation of value, are not permitted under the system of the present invention, an occasional invalid electronic coin is not a cause for alarm, as the values of electronic coins are low enough to limit the risk exposure which such electronic coins pose. Furthermore, because electronic coin editions according to the present invention have a limited lifetime, invalid electronic coins are automatically removed from circulation at regular intervals. Moreover, it is anticipated that the normal attrition of electronic coins due to losses (such as in lost or damaged payment cards) will always exceed the number of invalid electronic coins that may come into existence through natural stochastic processes (such as normal data errors). Counterfeit electronic coins, however, are invalid electronic coins that are intentionally created by attackers in an effort to cheat the system, and thereby pose a threat to the system's integrity. If counterfeit electronic coins occur at all, the occurrences would be more than just occasional, so it is important to be able to trace counterfeit electronic coins to their source. The term "bogus electronic coin" herein denotes an invalid electronic coin which appears to be a counterfeit electronic coin, but has not yet been confirmed by investigation to be a counterfeit electronic coin. The purposes of the continuous electronic coin sampling watchdog according to the present invention are therefore:

1. to determine if bogus electronic coins are in circulation;
2. if bonus electronic coins are not in circulation, to confirm this and thereby to establish a degree of confidence in the integrity of the system;
3. if bogus electronic coins are in circulation, to determine if the occurrences are serious enough to warrant further investigation; and
4. if the occurrences of bogus electronic coins warrant further investigation, to provide information leading directly to the source of the bogus electronic coins.

The continuous electronic coin sampling watchdog must work efficiently and be enabled at all times, yet not impose an undue burden of data processing on the system. That is, the continuous electronic coin sampling watchdog should operate invisibly in the background. This goal is attained by the present invention, as illustrated below, for a case involving a bogus electronic coin in the form of an invalid electronic coin that has been put into circulation twice by the same payment card.

It should first be noted that there is nothing inherently wrong in having a payment card spend the same electronic coin more than once. Because electronic coins according to the present invention circulate, it is to be expected that a payment card will occasionally receive change that includes an electronic coin which was previously spent by that same payment card. A problem arises, however, when a payment card (or other device) spends an electronic coin that is presently in circulation elsewhere in the system, for this represents a duplication of value. The method according to the present invention of detecting such an invalid electronic coin at the electronic coin pool is both efficient and economical, and furthermore is able to identify the sources or sources of the duplicate electronic coins. The method can also be applied to detecting the sources of out-of-range electronic coins.

Figure 32:
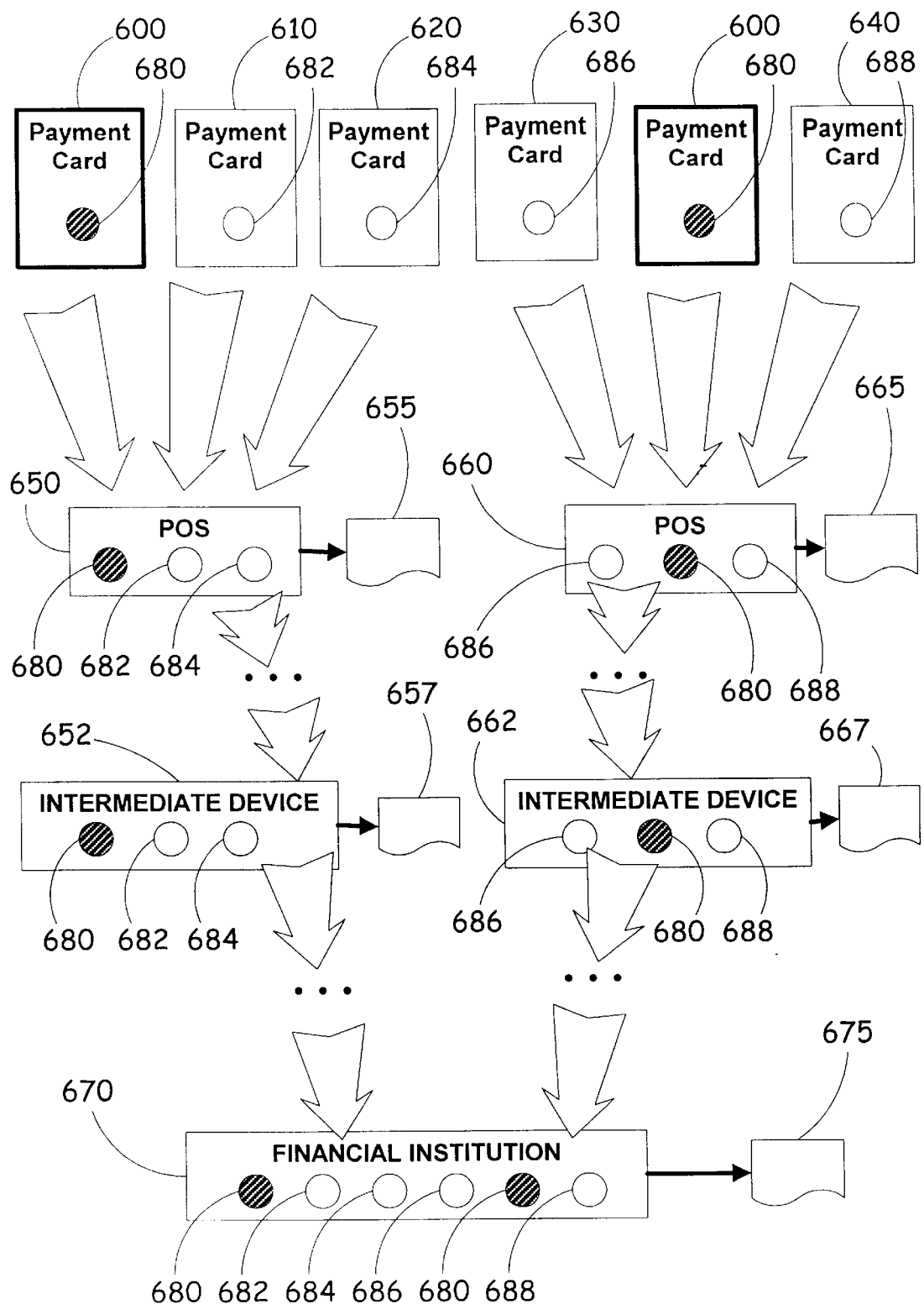
FIG. 32 is a diagram showing a watchdog according to the present invention, based on continuous electronic coin sampling to detect duplicate electronic coins.

A preferred embodiment of the present invention for detecting duplicate electronic coins is illustrated in FIG. 32, to which reference is now made. Payment cards 600, 610, 620, 630, and 640 spend electronic coins 680, 682, 684, 686, and 688, respectively. Payment card 600, however, spends electronic coin 680 more than once, and thus electronic coin 680 appears as a duplicate electronic coin. For example, payment card 600 might be defective, or might have been compromised by an attacker in order to produce and spend counterfeit electronic coins. In any case, electronic coin 680 is spent at a POS 650 and also, during the same (general time period, at a POS 660. (Payment card 600 and electronic coin 680 are emphasized in FIG. 32 to more readily distinguish them.) For the purpose of this example, it is assumed that electronic coin 680 is a counterfeit electronic coin, rather than merely an invalid electronic coin that has arisen incidentally from natural stochastic processes, such as data errors. However, the fact that electronic coin 680 is an intentional counterfeit cannot be absolutely determined without a thorough investigation, and therefore electronic coin 680 is referred to as a bogus electronic coin for this example.

Figure 33:
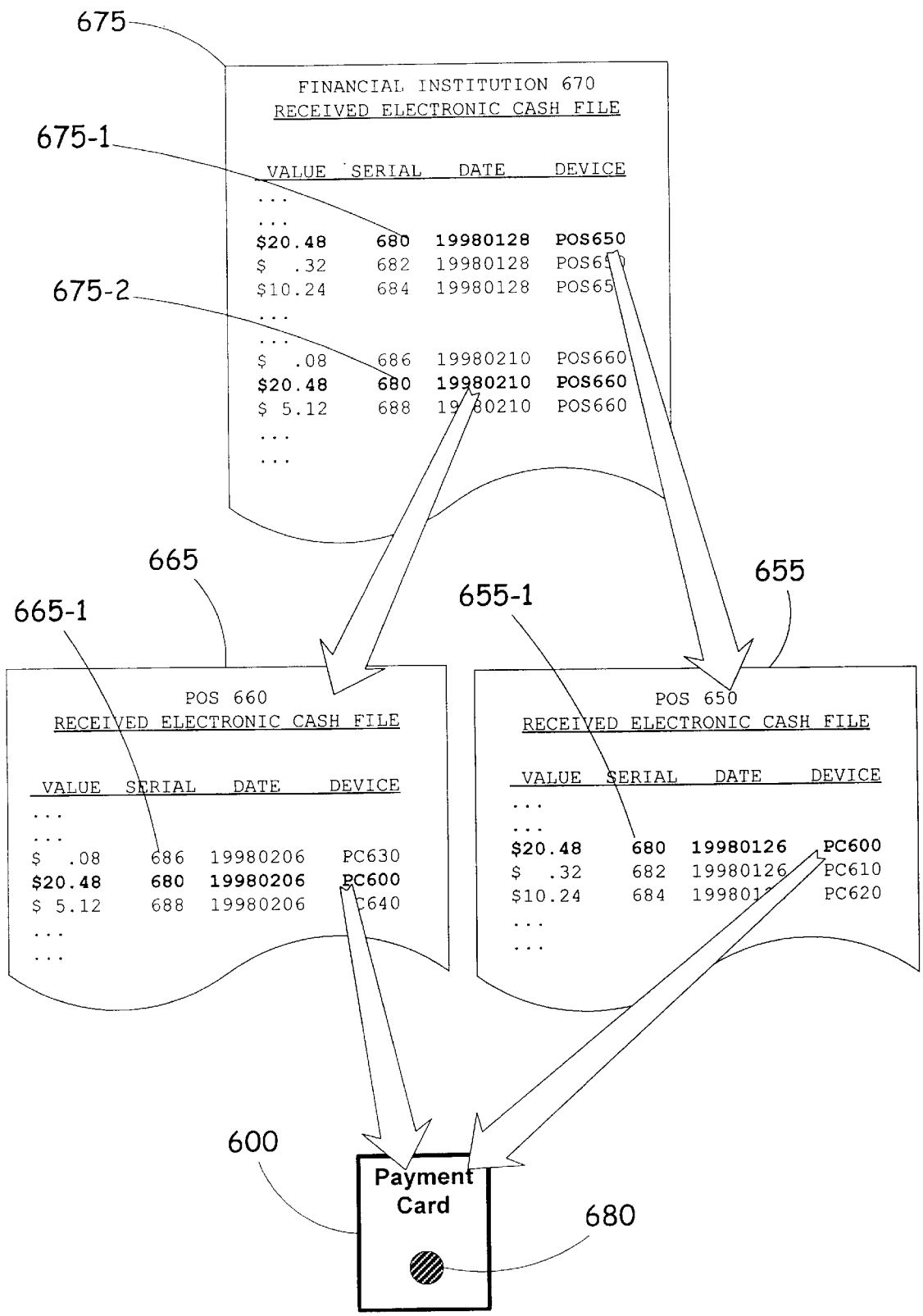
FIG. 33 is a diagram showing received electronic cash files and how they are used to perform an audit.

POS 650 maintains a received electronic cash file 655 and POS 660 maintains a received electronic cash file 665. As illustrated in FIG. 33, and as detailed below, a received electronic cash file contains records of each item of electronic cash received by a device during the course of a particular time period. In particular, the transaction records of received electronic cash file 665 and received electronic cash file 665 contain the serial number of each electronic coin which the POS has received during the time period along with the identity of the transferring, device that supplied the electronic coin, which, in this case, will be a payment card. As noted previously, this data is kept passively by the POS for a limited time. A certain amount of memory is allocated for these transaction records, and once the memory is full, new transaction records systematically replace the transaction records corresponding to the transactions having the earliest transaction date. The amount of time a specific received electronic cash file is retained can be increased by increasing the memory allocated in the POS for the received electronic cash file, and should be sufficient to retain a specific transaction record long enough that the electronic coin of the transaction will circulate back to the financial institution for statistical verification, as described below. In general, a received electronic cash file contains transaction records with an electronic cash identification field corresponding to arbitrary forms of received electronic cash, such as electronic bills as well as electronic coins. In general, also, a received electronic cash file contains transaction records with a transferring device identification field which contains the identifier for the device that transferred the electronic cash. Transferring devices include, but are not limited to, payment cards, points of sale, and intermediate stored-value devices as noted below.

Returning to FIG. 32, subsequent to the initial transactions at POS 650 and POS 660, the process of normal circulation augmented by the mixing and refreshing processes according to the present invention, causes electronic coins 680, 682, 684, 686, and 688 from POS 650 and POS 660 to reach a financial institution 670 via optional one or more intermediate stored-value devices between financial institution 670 and the level of POS 650 and POS 660. Intermediate stored-value devices include computers, servers, and special-purpose devices used to collect or transfer electronic cash from one device to another. Some generic intermediate stored-value devices (hereinafter referred to simply as "intermediate devices") are illustrated in FIG. 32 as an intermediate device 652 and an intermediate device 662, with ellipsis ( . . . ) indicating the option of additional intermediate devices in the chain. Intermediate device 652 maintains a received electronic cash file 657 and intermediate device 662 maintains a received electronic cash file 667. Because electronic coin 680 has been spent twice during the specified time interval (even at different POS terminals), there is a high probability that the two copies of electronic coin 680 will subsequently be found at financial institution 670 at overlapping times. The presence of the duplicate will he detected immediately by financial institution 670 when the electronic coin pool is updated, since the presence of a coin in the electronic coin pool is indicated by the setting of a bit corresponding to the serial number of electronic coin 680. Financial institution 670 maintains a received electronic cash file 675 which lists each electronic coin and the identity of the transferring device (such as a point of sale or intermediate device) which supplied the electronic coin to financial institution 670. In general, the transferring device can be any device which is appropriate to transfer electronic cash to the receiving device, including payment cards as well as points of sale and intermediate devices.

FIG. 33 shows the details of received electronic cash file 675, received electronic cash file 665, and received electronic cash file 655. For simplicity, FIG. 33 shows the chain of electronic coin transfers to be from POS 650 and POS 660 directly to financial institution 670 (FIG. 32), without intervening devices, such as device 652 and device 662 (FIG. 32). Therefore, received electronic cash file 675 shows POS 650 and POS 660 as the devices from which financial institution 670 received the electronic coins in question. The method presented herein is general, however, and operates effectively regardless of what devices, if any, are in the chain between the POS and the financial institution. The method is illustrated for the general case in the flowchart of FIG. 35, which is described in detail below. Returning to FIG. 33, a transaction record 675-1 has fields specifying the date of the transaction, the electronic coin serial number and value, and the device from which the electronic coin was obtained. When financial institution 670 (FIG. 32) detects a duplicate of electronic coin 680 in the electronic coin pool, received electronic cash file 675 is consulted to determine the immediate sources of electronic coin 680 (FIG. 33). It is seen that transaction record 675-1 and another transaction record 675-2 both show the arrival of electronic coin 680. Transaction record 675-1 shows that the first duplicate of electronic coin 680 came from POS 650, and transaction record 675-2 shows that the second duplicate of electronic coin 680 came from POS 660. At this point, POS 650 is queried to obtain selected data from received electronic cash file 655, and POS 660 is queried to obtain selected data from received electronic cash file 665. In both cases, the selected data consists of relevant records from the respective received electronic cash files, as illustrated by the example of FIG. 33. It is next seen that received electronic cash file 655 contains a transaction record 655-1 which shows that the first duplicate of electronic coin 680 originally came from payment card 600, and that received electronic cash file 665 contains a transaction record 665-1 which shows that the second duplicate of electronic coin 680 also originally came from payment card 600. At this point, the source of the duplicate electronic coins has been pinpointed and the relevant information can be reported and used for farther investigation, if warranted.

In the manner shown above, the original source of a bogus electronic coin can be quickly and economically determined. Note that this method does not require the storage and preservation of a vast quantity of archival data concerning transactions, but only a modest amount of data concerning relatively recent transactions. Moreover, this data is distributed throughout the system, does not need to be centralized, and can be acquired and maintained by devices already present in the system at negligible cost. Furthermore, unless there is a need to do so, no analysis is performed on the transaction data, and even when there is a need, the analysis is relatively simple. Thus, according to the present invention, the keeping of transaction data and the analysis as needed does not place any undue burden on the system, but is immediately responsive to any conditions that warrant attention.

Figure 34:
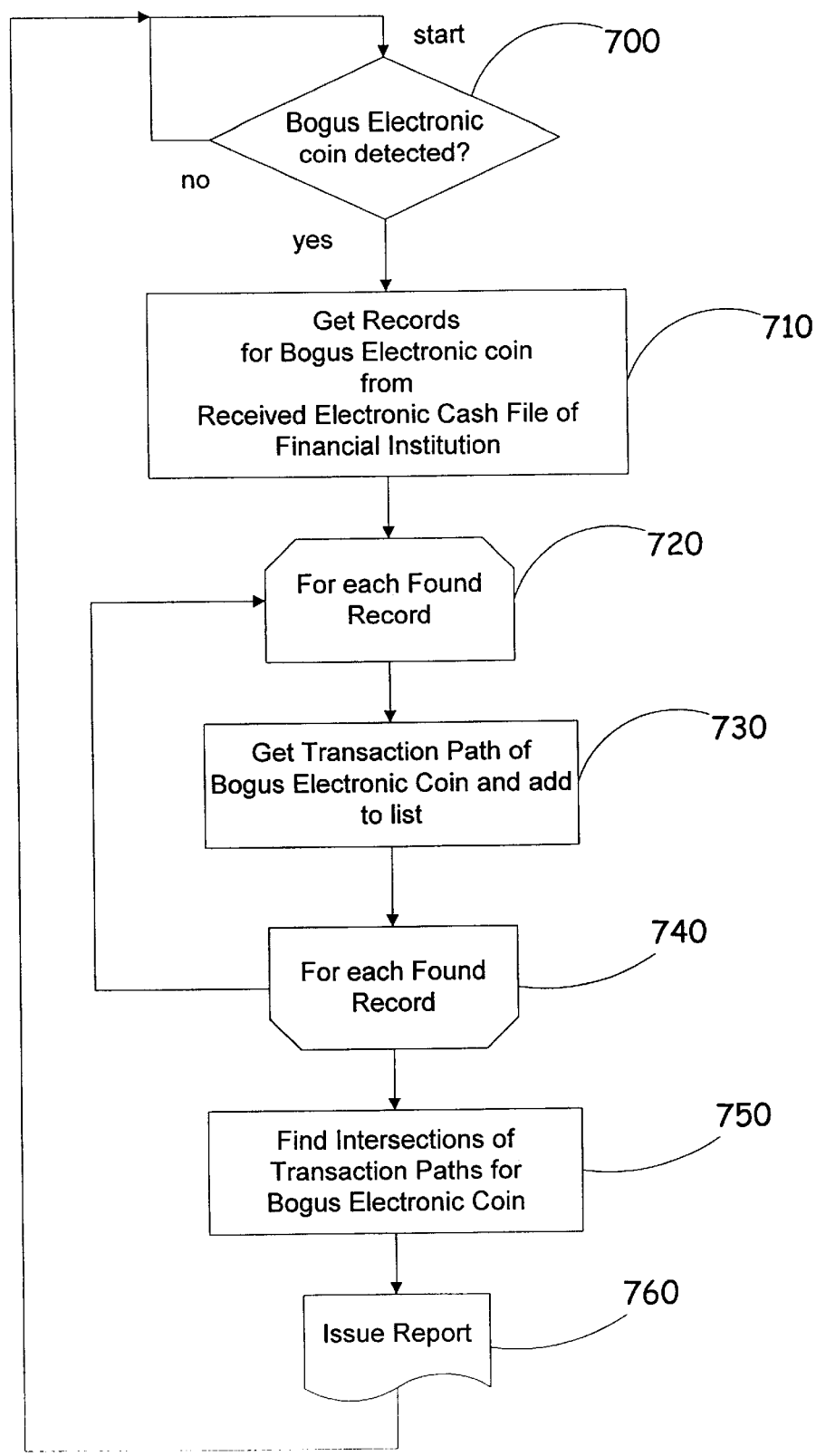
FIG. 34 is a flowchart illustration showing an example of how a continuous electronic coin sampling detects the source of a bogus electronic coin.
Figure 35:
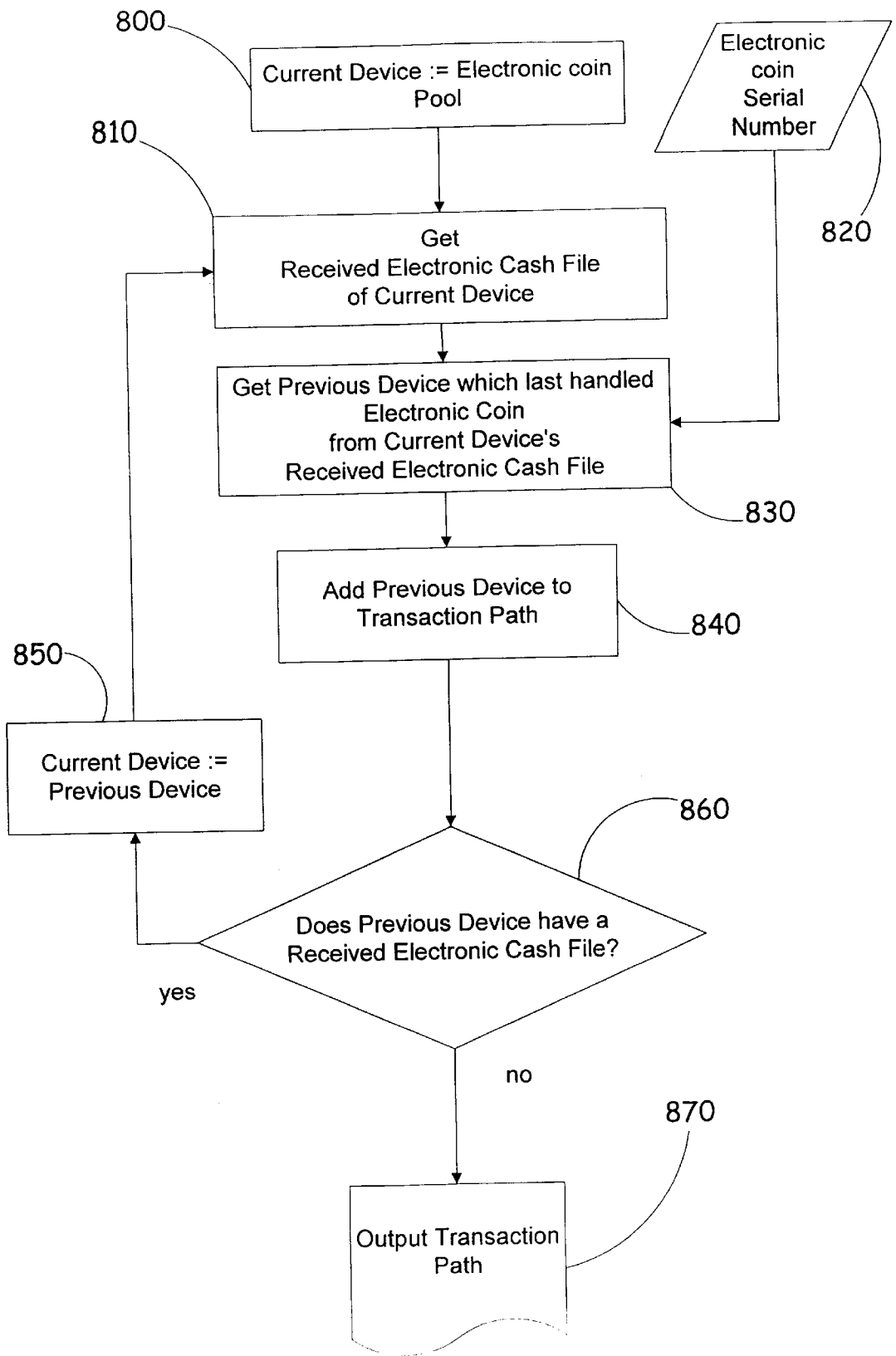
FIG. 35 is a flowchart illustration showing a recursive method for generating a transaction path for an electronic coin.

The general procedures for obtaining information about the source of a bogus electronic coin that arrives at the electronic coin pool of a financial institution are illustrated in FIG. 34 and FIG. 35. These methods are illustrated for locating the source of a bogus electronic coin but also apply to locating the source of a genuine electronic coin. In FIG. 34, the financial institution merely maintains an alert for incoming bogus electronic coins. As noted previously, an electronic coin in the electronic coin pool is represented as a set bit in a serial number vector, so if a duplicate electronic coin or out-of-range electronic coin arrives at the electronic coin pool, it will be immediately detected using negligible effort, without the need for any data searching or comparisons. This alert for incoming bogus electronic coins is represented in FIG. 34 by a decision point 700, which loops back upon itself if no bogus electronic coin is detected. If a bogus electronic coin is detected, then in a step 710, the transaction records for that electronic coin are retrieved from the received electronic coin received electronic cash file of the electronic coin pool. Following this is a loop starting at a loop start 720 and ending at a loop end 740, containing a step 730 in which the transaction path corresponding to each of the retrieved records is added to a list of transaction paths. When loop end 740 reaches the final record of the records retrieved in step 710, the loop exists, and the list of transaction paths is processed in a step 750 to find intersections in the transaction paths. Finally, a report output procedure 760 issues a report for human use by investigators, who can pursue the matter as necessary.

A recursive method of deriving a transaction path for an electronic coin in the electronic coin pool is illustrated in the flowchart of FIG. 35. The method starts by setting the current device to the financial institution's electronic coin pool in a step 800. Next in a step 810, the received electronic coin received electronic cash file of the current device is obtained. At the beginning of this recursive method, this means the received electronic coin received electronic cash file of the electronic coin pool will be obtained. As the recursion proceeds, however, the current device will change. Next, the serial number of the subject electronic coin (the electronic coin whose transaction path is desired) is input as data 820, and in a step 830 the device that previously handled the subject electronic coin is obtained, and in a step 840 the previous device is added to the transaction path. At a decision point 860, it is determined whether the previous device has a received electronic coin received electronic cash file. If the previous device does not have a received electronic coin received electronic cash file (for example, a payment card does not maintain a received electronic coin received electronic cash file), the method is complete and a transaction path 870 is output. If, however, the previous device does have a received electronic coin received electronic cash file, a step 850 sets the current device to the previous device and loops back to step 810.

In general, the method of locating the source of bogus electronic coins according to the present invention is therefore to compile the transaction paths for a number of bogus electronic coins and examine the transaction paths for intersections with the same device or devices. Devices which appear at or near such intersections are likely sources for the bogus electronic coins and should he investigated further.

It is noted that human investigation is ultimately needed because there are several different electronic coin tracing scenarios possible when dealing with bogus electronic coins, and the automated information obtained as described above may not in itself be conclusive, but may only provide indicia of a source of bogus electronic coins. For example, it is conceivable that POS 650 (FIG. 32) might have dispensed electronic coin 680 to another payment card 605 (not shown) as change rather than sent electronic coin 680 on to financial institution 670, and that payment card 605 would have subsequently spent electronic coin 680 at a POS 652 (not shown), which later sent electronic coin 680 to financial institution 670. In this case, there will be no record at financial institution 670 that POS 650 was ever involved with the transaction path of electronic coin 680. When financial institution 670 traces the path of electronic coin 680 back to original sources, the result will only show that payment card 600 spent one of the duplicates at POS 660, and that payment card 605 spent another of the duplicates at POS 652. This is not sufficient information to identify payment card 600 as the source of both duplicates. However, if a payment card is the source of a large number of bogus electronic coins, there is a reasonable probability that the payment card will appear in a statistically significant number of transaction paths involving the bogus electronic coins, and can therefore be detected.

It is also noted that payment cards are not the only suspects when tracing down the source of bogus electronic coins. A POS, for example, could also be a source of bogus electronic coins if it were somehow compromised by a dishonest merchant. In such a case, it would be expected that the POS would issue its bogus electronic coins as change, rather than send them directly up to the financial institution. In this way, the bogus electronic coins would be spent by unknowing customers at a variety of other (also innocent) POS devices before finding their way to the financial institution and being detected. The result would be that the compromised POS generating and distributing the bogus electronic coins would not appear in any transaction path. Instead, it would be expected that there would be a set of transaction paths for the bogus electronic coins that would be localized in the vicinity of the compromised POS. To uncover the identity of the compromised POS, it would be necessary for human investigators to deduce a connection between the various payment cards at the base of the transaction paths. This connection would be the compromised POS, and while automated tools could assist in this investigation, human intervention would be necessary to guide the investigation.

12. Aggregation of Transactions by Merchant

FIG. 21 describes the relations between a single POS, cards and financial institutions, showing how revenues are carried by charges and electronic bills while electronic coins revolve via payment, change, adjustment and refreshing, with zero average effect. It would be appreciated that a merchant operating a plurality of POS units (e.g. a supermarket,) may actually consolidate the various POS drawers of the same function (e.g. see 172 in FIG. 17), each into a single, merchant-level drawer, maintaining a similar statistical behavior as in a single POS. Thus, FIG. 21 represents also a case where the "POS" block is replaced by a "MERCHANT" block actually representing the flow of electronic bills, charges and electronic coins through a consolidated plurality of POS.

13. A Central Electronic Coin Issuer and Multiple Electronic Bill Issuers

As has been demonstrated in FIG. 21, revenues are actually carried by electronic bills and charge orders, while electronic coins revolve, with average zero net between cards and POS and between POS and financial institutions. The function of electronic coins thus becomes mostly technical, to enable small payments by larger-value charges and electronic bills. It might be preferable, in some systems, to have the smaller electronic coins issued by a single source, e.g. the system operator or coordinator, while electronic bills can be issued by and settled with a plurality of issuers. Thus, smaller electronic coins will be originated in and flow through a single electronic coin pool for adjustment and refreshing, while electronic bills will be purchased from issuers to be loaded into electronic purses, and later directed from points of sale to the respective issuers' pools for settlement.

14. Editions of Electronic Pennies

FIGS. 22–24 have introduced electronic pennies, which are actually counters of EMU value units. It is noted that if a new edition is issued (§3 above and FIGS. 19–20). new electronic pennies will also be issued. New and old electronic pennies will be stored and moved separately among separate partitions in all stored-value devices (similarly to FIGS. 19 and 20), with preference of moving, old electronic pennies (via payment, change, adjustment and refreshing)

toward the pools and new electronic pennies toward purses, just effectively draining the system from old electronic pennies. Old electronic pennies will be accumulated in an "old" partition at the electronic penny pool, and on the expiration date they will be counted, with a precision of 1 EMU, to effectively confirm the security and integrity of the payment system. It is noted, however, that this method is less accurate with electronic pennies than with electronic coins, since unused electronic pennies may unnoticeably compensate for counterfeit electronic pennies.

It will be further appreciated by persons skilled in the art that the present invention is not limited to what has been particularly shown and described hereinabove. Rather the scope of the present invention is defined only by the claims which follow:

What is claimed is:

1. A countable electronic monetary system for the transfer of electronic money in amounts which are an integer multiple of an elementary monetary unit, the transfer of electronic money made between two selected ones from a plurality of payment cards, a plurality of points of sale and a number of financial institutions, the countable electronic monetary system comprising:
 a) at least one electronic coin type, each electronic coin type of said at least one electronic coin type having a denomination of an integer number of said elementary monetary unit;
 b) a plurality of electronic coins each belonging to one of said at least one electronic coin type, each electronic coin of said plurality of electronic coins having a serial number;
 c) a plurality of stored-value devices, each for storing electronic coins from said plurality of electronic coins, comprising:
  i. a plurality of electronic coin purses, each included in a payment card of the plurality of payment cards;
  ii. a plurality of electronic coin drawers, each included in a point of sale of the plurality of points of sale; and
  iii. a number of electronic coin pools, each included in a financial institution of the number of financial institutions; and
 d) transaction means for the transfer of a selectable number of electronic coins belonging to a selectable electronic coin type, from a source stored-value device selected from said plurality of stored-value devices to a another, target stored-value device selected from said plurality of stored-value devices, said transaction means being operative to recording the serial number of each one of said selectable number of electronic coins in said target stored-value device and to erase said serial number from said source stored-value device, said transaction means being further operative, when transferring electronic coins from a stored-value device, to pick the transferred electronic coins according to preselected picking criteria.

2. The system of claim 1, wherein one of said at least one electronic coin type is an elementary electronic coin type having a denomination of one said elementarw monetary unit.

3. The system of claim 1 wherein said transaction means comprise:
 a. payment transaction means in which said source stored-value device is an electronic coin purse and said target stored-value device is an electronic coin drawer; and
 b. change transaction means in which said source stored-value device is an electronic coin drawer and said target stored-value device is an electronic coin purse.

4. The system of claim 1, wherein said at least one electronic coin type is a plurality of electronic coin types of different denominations.

5. The system of claim 4, wherein said transaction means comprise transaction selection means operative, upon receiving an amount to be paid, and upon a selected point of sale interfacing with a selected payment card, and according to the amount of electronic coins belonging to each of said plurality of electronic coin types stored in the electronic coin purse of said selected payment card, to automatically select, for each electronic coin type of said plurality of electronic coin types:
 a. a first group of a non-negative number of electronic coins from said electronic coin type to be transferred from the electronic coin purse of said selected payment card to the electronic coin drawer of said selected point of sale; and
 b. a second group of a non-negative number of electronic coins from said electronic coin type to be transferred from the electronic coin drawer of said selected point of sale to the electronic coin purse of said selected payment card.

6. The system of claim 1, further comprising:
 a. at least one charge card included in one of the plurality of payment cards;
 b. at least one charge drafter included in one of the plurality of points of sale; and
 c. at least one account corresponding to said at least one charge card and included in one of the number of financial institutions;
 d. and wherein said transaction means comprises:
  i. payment transaction means operative to transfer electronic coins from an electronic coin purse to an electronic coin drawer;
  ii. change transaction means operative to transfer electronic coins from an electronic coin drawer to an electronic coin purse;
  iii. charge transaction means operative to pay from an account via the corresponding charge card; and
  iv. transaction selection means operative, upon receiving an amount to be paid, and upon a selected point of sale interfacing with a selected payment card including a charge card and an electronic coin purse, and according to the electronic coins stored in said electronic coin purse, to automatically select:
   a) a non-negative amount to be paid through the charge card;
   b) a first group of a non-negative number of electronic coins to be transferred from the electronic coin purse of said selected payment card to the electronic coin drawer of said selected point of sale; and
   c) a second group of a non-negative number of electronic coins to be transferred from the electronic coin drawer of said selected point of sale to the electronic coin purse of said selected payment card.

7. The system of claim 1, further having at least two editions, and wherein:
 each of said plurality of electronic coins is assigned an edition selected from said at least two editions;
 each of said plurality of stored-value devices is operative to separating electronic coins according to their assigned edition; and
 said transaction means is operative to establishing a priority for the transfer of electronic coins of a first selectable edition with respect to the transfer of electronic coins of a second selectable edition.

8. The system of claim 1, further having, for each of said at least one electronic coin type:
   a. a predefined number of allowed repetitions for any serial number of electronic coins belonging to said at least one electronic coin type; and
   b. at least one of said number of electronic coin pools having security means to count the number of repetitions of each of said serial number of electronic coins belonging to said electronic coin type and stored in said electronic coin pool, and identify and report serial numbers whose repetition exceeds said predefined number of allowed repetitions.

9. The system of claim 1, wherein said number of electronic coin pools is at least two electronic coin pools, and wherein, for a selected electronic coin type from said at least one electronic coin type each of said at least two electronic coin pools is assigned a distinctive group of serial numbers of electronic coins belonging to said selected electronic coin type.

10. The system as in claim 1, wherein at least one of the plurality of points of sale comprises:
   a. means for creating and storing a received electronic cash file, said received electronic cash file containing records including an electronic cash identification field for each instance of electronic cash received from a payment card and a transferring device identification field for said payment card; and
   b. means for retrieving and delivering data from said received electronic cash file.

11. The system as in claim 1, wherein at least one of the number of financial institutions comprises:
   a. means for creating and storing a received electronic cash file, said received electronic cash file containing records including an electronic cash identification field for each instance of electronic cash received from a transferring device, and a transferring device identification field for said transferring device; and
   b. means for retrieving and delivering data from said received electronic cash file.

12. The system as in claim 11, wherein at least one of the number of financial institutions further comprises means for requesting, storing, and delivering data from a received electronic cash file from a transferring device.

13. The system as in claim 1, further comprising at least one intermediate device, said at least one intermediate device operative to receiving, storing, and transferring electronic cash.

14. The system as in claim 13, wherein said at least one intermediate device comprises:
   a. means for creating and storing a received electronic cash file, said received electronic cash file containing records including an electronic cash identification field for each instance of electronic cash received from a transferring device, and a transferring device identification field for said transferring device; and
   b. means for retrieving and delivering data from said received electronic cash file.

15. The system as in claim 14, wherein said at least one intermediate device further comprises means for requesting, storing, and delivering data from a received electronic cash file from a transferring device.

16. The system of claim 1, further comprising electronic pennies having no serial numbers.

17. A method for the establishment, storage and transfer of electronic monetary values in amounts which are an integer multiple of an elementary monetary unit, within a monetary system having a plurality of stored-value devices to electronically store monetary values therein, said plurality of stored-value devices including a plurality of payment cards with electronic coin purses, a plurality of points of sale with electronic coin drawers, and at least one electronic coin pool of a financial institution, said method comprising the steps of:

determining at least one electronic coin type, each having a denomination of an integer number of the elementary monetary unit;

generating, for each of said at least one electronic coin type, a selectable plurality of electronic coins each having the denomination of said electronic coin type and a serial number;

depositing, in each of said plurality of stored-value devices, a group of a non-negative number of electronic coins, the serial number of each electronic coin deposited in a storage device written onto this storage device; and performing transactions by transferring selectable electronic coins of selectable electronic coin types from a selected source stored-value device to a selected target stored-value device, both selected from said plurality of stored-value devices, by writing the serial number of each of said selectable electronic coins onto said target stored-value device and erasing said serial number from said source stored-value device, wherein said performing transactions further includes picking the transferred electronic coins according to preselected picking criteria.

18. The method of claim 17, wherein one of said at least one electronic coin type is an elementary electronic coin type having denomination of one elementary monetary unit.

19. The method of claim 17, wherein said stored-value devices include purses and drawers, and wherein said performing transactions comprises:

performing a payment transaction, wherein said source stored-value device is a purse and said target stored-value device is a drawer; and performing a change transaction, wherein said source stored-value device is a drawer and said target stored-value device is a purse.

20. The method of claim 17, wherein said at least one electronic coin type is a plurality of electronic coin types of different denominations.

21. The method of claim 20, wherein, upon receiving an amount to be paid, upon a selected drawer interfacing with a selected purse, and according to the amount of electronic coins belonging to each of said plurality of electronic coin types stored in said purse, said performing transactions further comprises the step of automatically calculating and selecting, for each electronic coin type of said plurality of electronic coin types;

a first group of a non-negative number of electronic coins from said electronic coin type to he transferred from the electronic coin purse of said selected payment card to the electronic coin drawer of said selected point of sale; and a second group of a non-negative number of electronic coins from said electronic coin type to be transferred from the electronic coin drawer of said selected point of sale to the electronic coin purse of said selected payment card.

22. The method of claim 17, wherein the monetary system further includes at least one payment card with a charge card and at least one point of sale with a charge drawer, the method further comprising the steps of:

automatically selecting a non-negative amount to be paid via a payment card charge card, said non-negative amount selected according to the electronic coins in the payment card electronic coin purse;

automatically selecting a first group of a non-negative number of electronic coins from said electronic coin type to be transferred from the payment card electronic coin purse to the point of sale electronic coin drawer said first group of a non-negative number of electronic coins selected for each electronic coin type and according to the electronic coins in the electronic coin purse; and automatically selecting a second group of a non-negative number of electronic coins from said electronic coin type to be transferred from the point of sale electronic coin drawer to the payment card electronic coin purse, said second group of a non-negative number of electronic coins selected for each electronic coin type and according to the electronic coins in the electronic coin purse.

23. The method of claim 17, further comprising the steps of:

defining at least two editions;

assigning an edition selected from said at least two editions to each electronic coin; and establishing the priority of the transfer of electronic coins of a first selectable edition with respect to the transfer of electronic coins of a second selectable edition.

24. The method of claim 17, further comprising the steps of:

defining, for each of said at least one electronic coin type, a predefined number of allotted repetitions for any serial number of electronic coins belonging to this electronic coin type; and counting for each electronic coin type, in a pool of said at least one pool, the number of repetitions of each serial number of electronic coins belonging to said electronic coin type and stored in said pool, and identifying and reporting serial numbers whose repetition exceeds said predefined number of allowed repetitions.

25. The method of claim 17, wherein said at least one pool is at least two pools, further comprising, for a selected electronic coin type from said at least one electronic coin type, the steps of:

assigning to each of said at least two pools a distinctive group of serial numbers of electronic coins belonging to said selected electronic coin type; and selecting, when said performing transactions is performed to transfer electronic coins belonging to said selected electronic coin type to a pool, the pool for each of the transferred electronic coins in accordance to the assignment of said distinctive group to which the serial number of the transferred electronic coin belongs.

26. The system of claim 1, wherein said preselected picking criteria are selected from the group consisting of random electronic coin picking and first-in-first-out electronic coin picking.

27. The method of claim 17, said preselected picking criteria are selected from the group consisiting of random electronic coin picking and first-in first-out electronic coin picking.

28. A countable electronic monetary system for the transfer of electronic money in amounts which are an integer multiple of an elementary monetary unit, the transfer of electronic money made between two selected ones from a plurality of payment cards, a plurality of points of sale and a number of financial institutions, the countable electronic monetary system comprising:

a) at least one electronic coin type, each electronic coin type of said at least one electronic coin type having a denomination of an integer number of said elementary monetary unit;

b) a plurality of electronic coins each belonging to one of said at least one electronic coin type, each electronic coin of said plurality of electronic coins having a serial number;

c) a plurality of stored-value devices, each for storing electronic coins from said plurality of electronic coins, comprising:
  i. a plurality of electronic coin purses, each included in a payment card of the plurality of payment cards;
  ii. a plurality of electronic coin drawers, each included in a point of sale of the plurality of points of sale; and
  iii. a number of electronic coin pools, each included in a financial institution of the number of financial institutions;

d) electronic pennies having no serial numbers; and e) transaction means for the transfer of a selectable number of electronic coins belonging to a selectable electronic coin type, from a source stored-value device selected from said plurality of stored-value devices to a another, target stored-value device selected from said plurality of stored-value devices, said transaction means being operative to recording the serial number of each of one of said selectable number of electronic coins in said targer stored-value device and to erase said serial number from said source stored-value device.

* * * * *

UNITED STATES PATENT AND TRADEMARK OFFICE
CERTIFICATE OF CORRECTION

PATENT NO. : 6,119,946
DATED : September 19, 2000
INVENTOR(S) : Mordechai Teicher It is certified that error appears in the above-identified patent and that said Letters Patent is hereby corrected as shown below:

<u>Title page,</u>
Item [22], Filing Date, change "March 3, 1998" to -- March 30, 1998 --.

Signed and Sealed this

Fifth Day of February, 2002

Attest:

JAMES E. ROGAN
*Director of the United States Patent and Trademark Office*

*Attesting Officer*